(12) United States Patent
Masri et al.

(10) Patent No.: US 12,473,577 B2
(45) Date of Patent: Nov. 18, 2025

(54) METHOD FOR PRODUCING MICROBIAL LIPIDS

(71) Applicant: TECHNISCHE UNIVERSITÄT MÜNCHEN, Munich (DE)

(72) Inventors: Mahmoud Masri, Dachau (DE); Thomas Brück, Eichenried (DE)

(73) Assignee: TECHNISCHE UNIVERSITÄT MÜNCHEN, Munich (DE)

( * ) Notice: Subject to any disclaimer, the term of this patent is extended or adjusted under 35 U.S.C. 154(b) by 700 days.

(21) Appl. No.: 17/425,721

(22) PCT Filed: Feb. 18, 2020

(86) PCT No.: PCT/EP2020/054212
§ 371 (c)(1),
(2) Date: Jul. 24, 2021

(87) PCT Pub. No.: WO2020/169586
PCT Pub. Date: Aug. 27, 2020

(65) Prior Publication Data
US 2024/0052384 A1 Feb. 15, 2024

(30) Foreign Application Priority Data

Feb. 18, 2019 (EP) ..................................... 19157805

(51) Int. Cl.
*C12P 7/64* (2022.01)
*C12N 1/14* (2006.01)

(52) U.S. Cl.
CPC ................ *C12P 7/64* (2013.01); *C12N 1/145* (2021.05)

(58) Field of Classification Search
CPC .................................. C12P 7/64; C12N 1/145
See application file for complete search history.

(56) References Cited

FOREIGN PATENT DOCUMENTS

| CN | 108251464 A | 7/2018 |
| JP | S60259192 A | 12/1985 |
| WO | 2015/092544 A1 | 6/2015 |
| WO | 2015/095692 A2 | 6/2015 |

OTHER PUBLICATIONS

Bonturi et al., "Single Cell Oil Producing Yeasts Lipomyces starkeyi and Rhodosporidium toruloides: Selection of Extraction Strategies and Biodiesel Property Prediction." Energies 2015, 8, 5040-5052 (Year: 2015).*
Award, Dania et al. "Multi-Factorial-Guided Media Optimization for Enhanced Biomass and Lipid Formation by the Oleaginous Yeast Cutaneotrichosporon oleaginosus," Frontiers in Bioengineering and Biotechnology, vol. 7 (Article 54), pp. 1-13, Mar. 26, 2019.
Bracharz, Felix et al. "Opportunities and challenges in the development of Cutaneotrichosporon oleaginosus ATCC 20509 as a new cell factory for custom tailored microbial oils," Microbial Cell Factories, vol. 16, pp. 1-15, 2017.
Gong, Zhiwei et al. "Co-fermentation of acetate and sugars facilitating microbial lipid production on acetate-rich biomass hydrolysates," Bioresource Technology, vol. 207, pp. 102-108, 2016.
Huang, Xiang-Feng et al., "Enhancement of extracellular lipid production by oleaginous yeast through preculture and sequencing batch culture strategy with acetic acid," Bioresource Technology, vol. 247, pp. 395-401, 2017.
Jin, Guojie et al., "Enzyme-assisted extraction of lipids directly from the culture of the oleaginous yeast Rhodosporidium toruloides," Bioresource Technology, vol. 111, pp. 378-382, 2012.
Masri, Mahmoud A. et al., "A waste-free, microbial oil centered cyclic bio-refinery approach based on flexible macroalgae biomass," Applied Energy, vol. 224, pp. 1-12, 2018.
Masri, Mahmoud A. et al., "A sustainable, high-performance process for the economic production of waste-free microbial oils that can replace plant-based equivalents," Energy & Environmental Science, pp. 1-16, Jun. 19, 2019.
Patel, Alok et al., "An Overview of Current Pretreatment Methods Used to Improve Lipid Extraction from Oleaginous Microorganisms," Molecules, vol. 23, pp. 1-22, 2018.
Shaigani, Pariya et al. "Cultivation of Cutaneotrichosporon oleaginosus on marine microalgae hydrolysates for sustainable production of lipids," Biocat 2018 (9th International Congress on Biocatalysis), Hamburg, Germany, 2018.
First Office Action issued by the Chinese Patent Office dated Jun. 10, 2023 in parallel Chinese application No. 202080013705.0 with English Translation.
Kumar Vikram, et al., "High cell density lipid rich cultivation of a novel microalgal isolate Chlorella sorokiniana FC6 IITG in a single-stage fed-batch mode under mixotrophic condition", Bioresource Technology 170:115-124, Oct. 1, 2014.
Maurya, Rahulkumar, et al., "Hydrolysate of lipid extracted microalgal biomass residue: An algal growth promoter and enhancer", Bioresource Technology 207:197-204, May 1, 2016.
Office Actiion issued by the European Patent Office dated Aug. 20, 2025, in the parallel European Patent Application No. 20705367.9.

\* cited by examiner

*Primary Examiner* — Suzanne M Noakes

(74) *Attorney, Agent, or Firm* — SALIWANCHIK, LLOYD & EISENSCHENK

(57) ABSTRACT

The present invention relates to a method for producing microbial lipids.

14 Claims, 20 Drawing Sheets

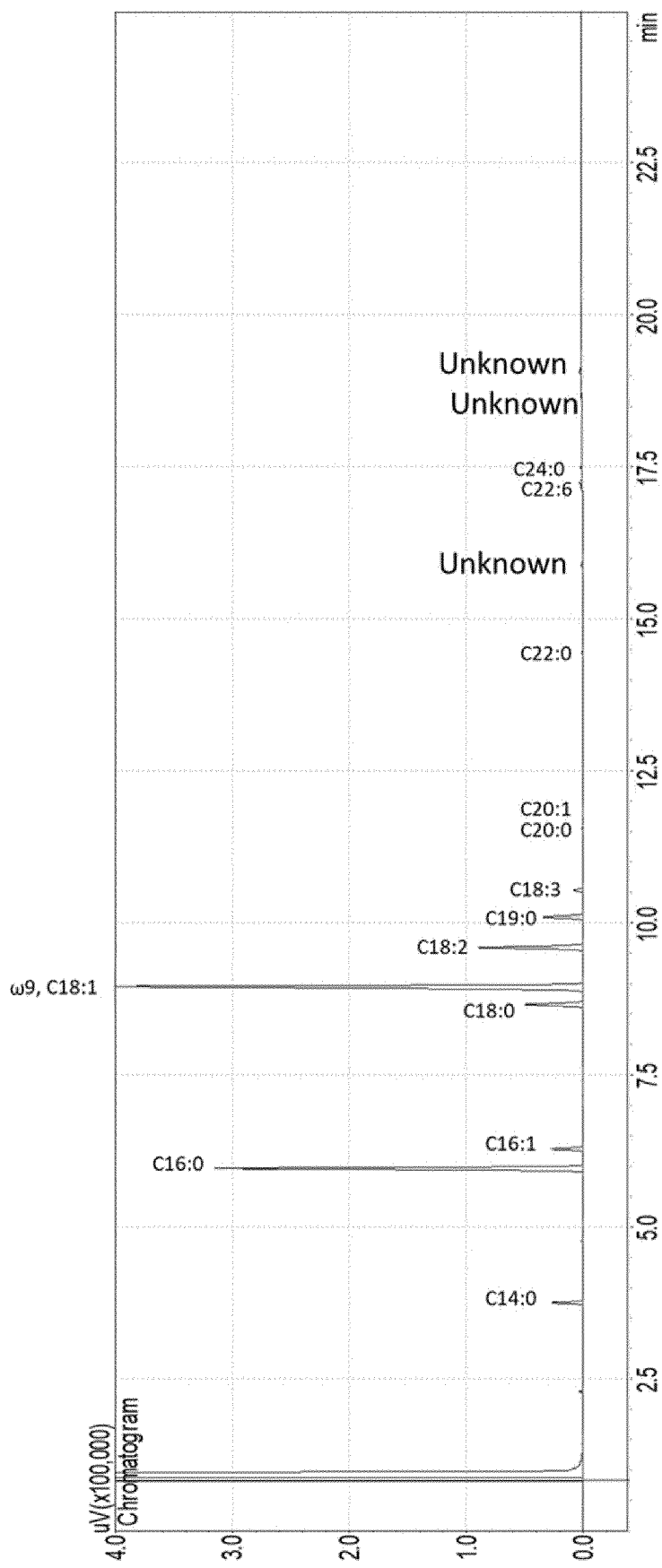
Figure 17: 100% acetic acid

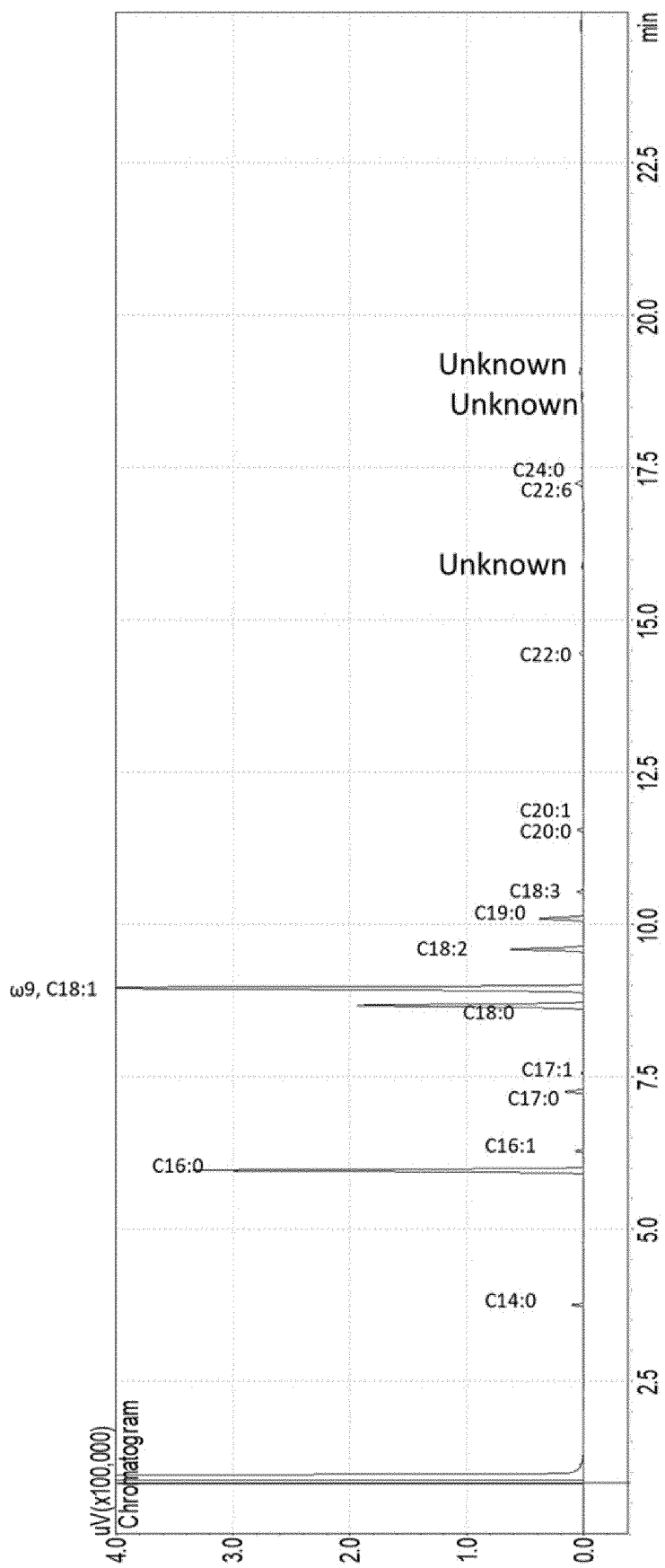
Figure 18: 90% acetic acid+ 10% isobutyric acid

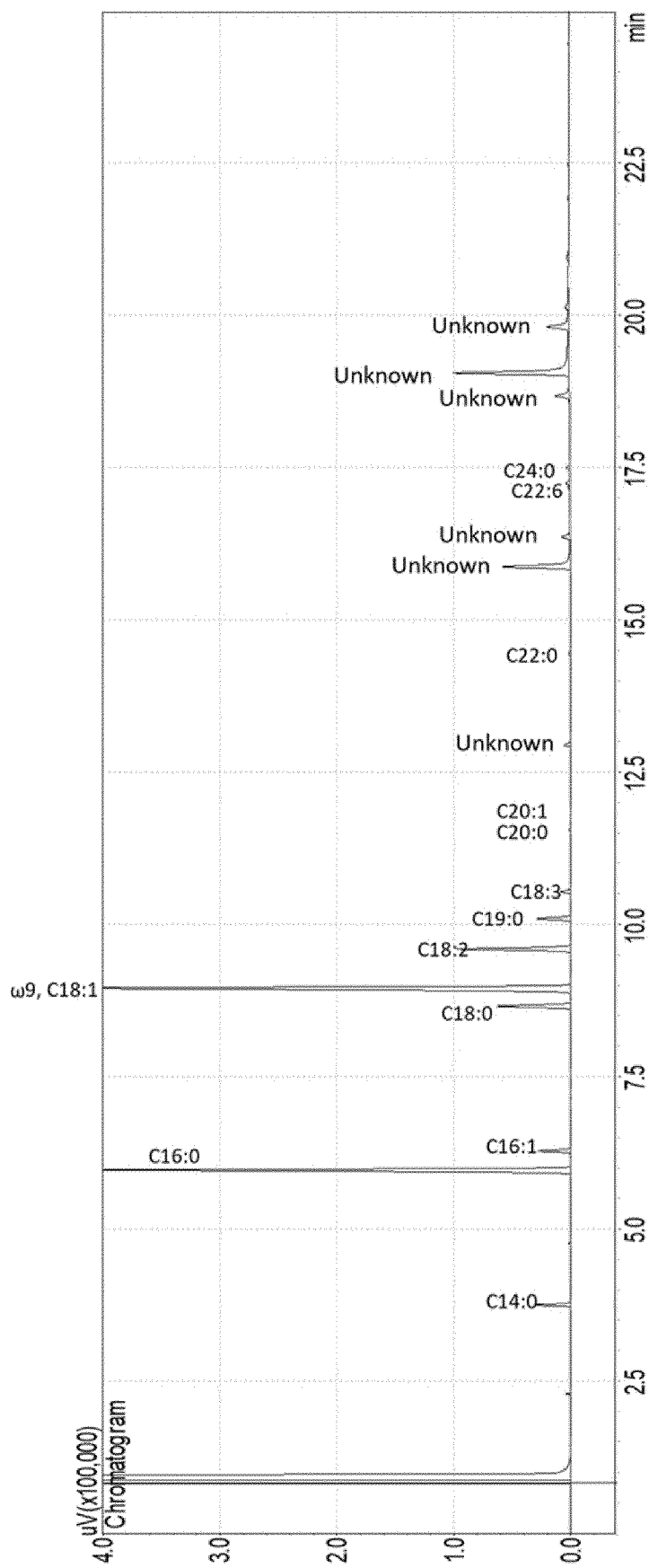
Figure 19: 90% acetic acid+ 10% isovaleric acid

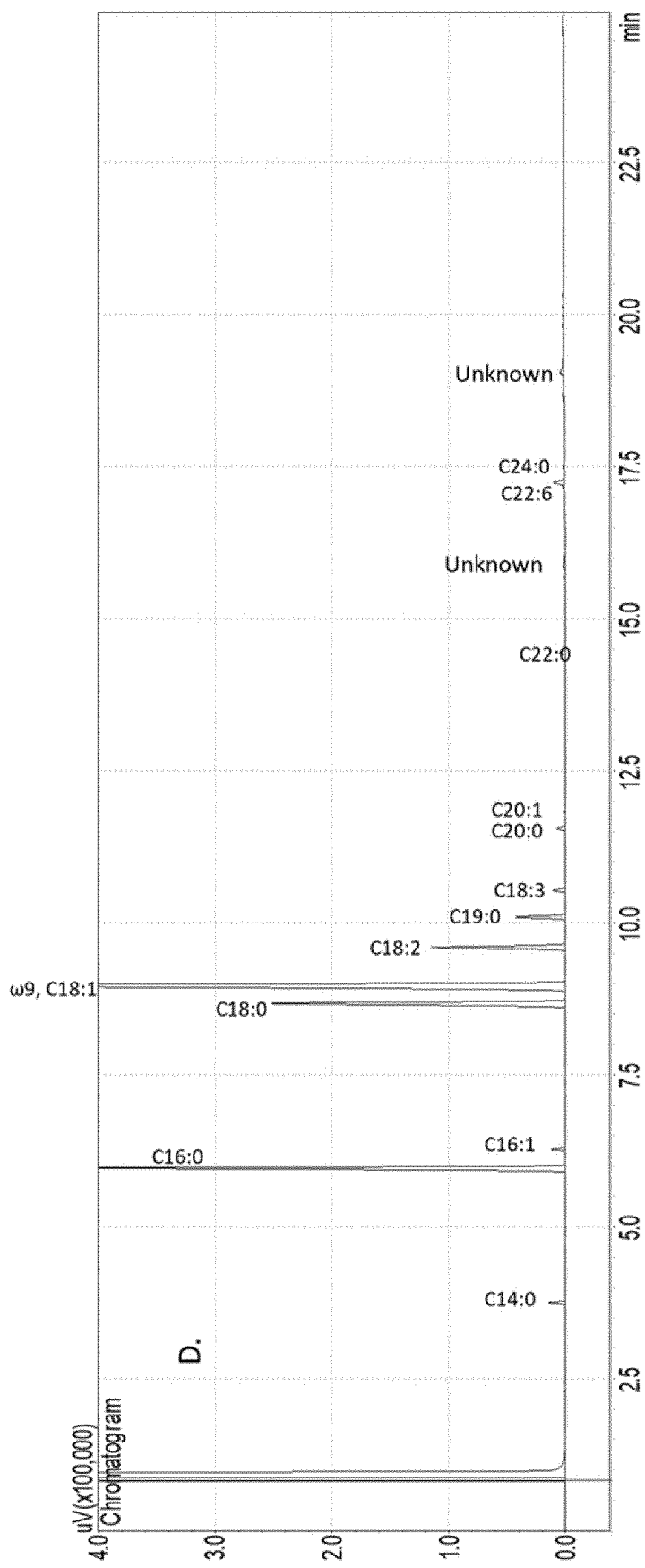
Figure 20: 90% acetic acid+ 10% cortonic acid

METHOD FOR PRODUCING MICROBIAL LIPIDS

CROSS REFERENCE TO RELATED APPLICATIONS

This application is a National Stage Application of International Application Number PCT/EP2020/054212, filed Feb. 18, 2020; which claims priority to European Patent Application No. 19157805.3, filed Feb. 18, 2019.

The present invention relates to a method for producing microbial lipids.

In view of a potentially negative impact of plant-based production of triglyceride oils due to excessive land use, monocultures and clearing of biologically diverse habitats in favour of single species, microbial oil production has been identified as a potential attractive alternative thereto. However, economically, feedstock availability and costs, triglyceride oil productivity as well as the number of process steps involved up until oil recovery are key challenges that impede a production on an industrial-scale. According to Koutinas et al. 2014, Fuel, Volume 116, pp. 566-577 a microbially produced oil is estimated to cost approximately USD 5.5/kg, whereas soybean oil and palm oil only cost approximately USD 0.79 and 0.66/kg, respectively. Therefore, in order to reduce this significant price gap, a microbial oil process needs to be designed to maximize the productivity and minimize the number of process steps in addition to the exploitation of the process waste. One problem is the identification of a sustainable and cheap feedstock that can be used in the microbial manufacture of oils. An additional aspect that needs to be considered is an optimization of the downstream processes for lipid recovery, as these appear to have a high overall impact on process economics. Conventional lipid extraction procedures typically involve a cell-wall destruction followed by lipid extraction using organic solvents which, in many instances, are toxic, such as chloroform or hexane. Additionally, in the case of rigid cell-walls, additionally harsh treatments are typically implemented, such as temperature shocks, chemical treatment or high pressure homogenizations which add to the costs of the overall process. The use of organic solvents and extractions of the lipids negatively impacts the quality of the finished product and limits the possibility of using such lipids for food and/or pharmaceutical applications.

Accordingly, the present invention aims to provide for a method that is easy and simple to perform and that therefore reduces the overall effort necessary for producing microbial lipids using the cultivation of oleaginous microorganisms.

In a first aspect, the present invention relates to a method for producing microbial lipids, said method comprising the steps:

a) providing an oleaginous microorganism;
b) growing said oleaginous microorganism in a medium comprising a carbon source and an organic acid, and thereby allowing said oleaginous microorganism to produce microbial lipids;
c) performing a purely enzymatic treatment of said grown oleaginous microorganism without any solvent-based extraction or chemicals-based demulsification, to make said produced microbial lipids amenable for subsequent harvesting;
d) harvesting said produced microbial lipids by a density-based separation method.

In one embodiment, said oleaginous microorganism is selected from yeasts, fungi, bacteria and microalgae, wherein, preferably, said oleaginous microorganism is an oleaginous yeast, wherein more preferably, said oleaginous yeast is selected from the genus *Rhodospirillum, Trichosporon, Rhodosporidium*, Rhodosporon, *Candida, Cryptococcus, Lipomyces, Yarrowia, Rhodotorula, Apiotrichum* and *Cutaneotrichosporon*

If said oleaginous microorganism is a fungus, it is an oleaginous fungus, wherein preferably, said oleaginous fungus is selected from the genus *Cunninghamella, Aspergillus, Mortierella* and *Humicola*.

If said oleaginous microorganism is a bacterium, it is an oleaginous bacterium, wherein, preferably, said oleaginous bacterium is selected from the genus *Rhodococcus, Acinetobacter* and *Bacillus*.

If said oleaginous microorganism is a microalga, it is an oleaginous microalga, wherein, preferably, said microalga is selected from the genus *Chlorella, Pseudochlorococcum, Nannochloris, Nannochloropsis, Isochrysis, Tribonema, Dunaliella, Ankistrodesmus, Botryococcus, Pavlova, Scenedesmus, Skeletonema* and *Nitzschia*.

Preferred species of oleaginous yeasts are: *Trichosporon oleaginosus, Trichosporon capitatu, Trichosporon asahii, Lipomyces starkeyi, Rhodosporidium toruloides, Yarrowia lipolytica, Rhodotorula graminis, Rhodotorula glutinis, Cutaneotrichosporon oleaginosus, Apiotrichum curvarum, Cryptococcus curvatus, Candida* sp, *Rhodotorula gracilis*. A particularly preferred species of oleaginous yeast is *Cutaneotrichosporon oleaginosus*.

Preferred species of oleaginous microalgae are: *Chlorella* sp., *Pseudochlorococcum* sp., *Nannochloris* sp, *Nannochloropsis* sp., *Isochrysis* sp, Tribonema minus, *Dunaliella* sp., *Ankistrodesmus* sp., *Botryococcus braunii, Pavlova* sp., *Scenedesmus* sp., *Skeletonema* sp., *Nitzschia* sp., Preferred species of oleaginous bacteria are: *Rhodococcus opacus, Acinetobacter calcoaceticus* and *Bacillus alcalophilus*.

Preferred species of oleaginous fungi are: *Cunninghamella* sp, *Aspergillus* sp, *Mortierella* sp, and *Humicola* sp, In one embodiment, said carbon source is selected from the group comprising carbohydrates; amino acids; fatty acids; preferably monosaccharides, preferably pentoses or hexoses, more preferably glucose, xylose and/or mannitol; oligosaccharides; hydrolysates of animal tissues, plant tissues or of microorganisms; and combinations of any of the foregoing, wherein more preferably, said carbon source is glucose.

In one embodiment, said organic acid is selected from the group comprising acetic acids, malonic acid, oxalic acid, citric acid, propionic acid, valeric acid, acrylic acid, crotonic acid, butyric acid, Isobutyric acid, Isovaleric acid, 3-Hydroxybutyric acid, 3-Hydroxypropionic acid, 2-Hydroxybutyric acid, Lactic acid and the respective salt(s) of such acid, as well as mixtures of any of the foregoing organic acids. Preferably, said organic acid is acetic acid or acetate. In one embodiment, said organic acid is acetic acid or acetate only; in another embodiment said organic acid is a combination of acetic acid or acetate, with any of the other aforementioned organic acids.

It should be noted that the term "organic acid", as used herein is meant to encompass the respective organic acid irrespective of its degree of protonation, i.e. it is meant to encompass said acid in its protonated state(s) as well as deprotonated state(s), e.g. when in aqueous solution at a pH at which it is protonated or deprotonated, respectively, depending on the respective pKa-value(s). The term "organic acid", as used herein, is also meant to encompass salt(s) of the organic acid, e.g. the respective metal salts of such organic acid. Examples of such metal salts are the alkali salts or earth alkaline salts of the respective organic acid. The salts may be in their dissociated form or undissociated form. The term "mixtures of organic acids", as used herein is meant to encompass mixtures of organic acids in their respective acid form, i.e. with other organic acids, mixtures of organic acids in their acid form with other organic acids in their salt form, and mixtures of salts of organic acids with other salts of organic acids.

It should also be noted that the term "organic acid", as used herein, does not encompass fatty acids or amino acids.

The phrase "a carbon source and an organic acid", as used herein, implies that the "carbon source" is different from the "organic acid". Hence the two entities are chemically different.

In one embodiment, the concentration of said carbon source during step b) is in a range from 150 to 400 mM, preferably 200 to 300 mM. In one embodiment, the concentration of said organic acid during step b) is in a range of from 30 to 100 mM, preferably 50 to 70 mM. In one embodiment, the concentration of said carbon source during step b) is in a range from 150 mM to 400 mM, preferably 200 to 300 mM, and the concentration of said organic acid during step b) is in a range of from 30 mM to 100 mM, preferably 50 to 70 mM.

In one embodiment, during step b) the weight ratio of carbon to nitrogen (C:N) in the medium is (100-200):1, especially if it is a limited nitrogen medium. In another embodiment, during step b); the weight ratio of carbon to nitrogen (C:N) in the medium is (10-100):1, preferably (10-50):1, especially when it is not a nitrogen limited medium. In one embodiment, the medium used in step b) is a nitrogen-rich medium. The weight ratios indicated above and further below are weight ratios in the starting medium, i.e. when step b) begins. As used herein, the term "nitrogen-rich medium" refers to a medium that is not a limited nitrogen medium. In one embodiment, a "nitrogen-rich medium" refers to a medium in which the weight ratio of carbon to nitrogen (C:N) is less than 100, preferably equal to or less than 80.

In one embodiment, said purely enzymatic treatment of said grown oleaginous microorganism is a treatment of said microorganism with a hydrolase, alone, or in combination with/followed by a protease.

As used herein, the term "a purely enzymatic treatment of said grown oleaginous microorganism without any pretreatment, solvent-based extraction or chemicals-based demulsification" is meant to refer to an enzymatic treatment of said oleaginous microorganism in which there is a) no extraction using one or several solvents or b) no demulsification using one or several (suitable) chemical reagents or c) neither of a) and b). Preferably such term is meant to refer to an enzymatic treatment devoid of any exposure to an extracting solvent and devoid of any exposure to a demulsifying chemical reagent. The term is also meant to exclude the performance of any other pretreatment of said grown oleaginous microorganism.

It should be noted that in embodiments of the invention, the "purely enzymatic treatment" excludes the performance of any pretreatment of the grown oleaginous microorganism, which pretreatment may be chemical (using one or several chemical reagents to which the grown oleaginous microorganism would be exposed) or physical (such as the change of a physical condition, e.g. temperature, pressure, ultrasound, light, irradiation with electromagnetic radiation etc.).

In one embodiment, said hydrolase has been obtained from a fungus, preferably a filamentous fungus, more preferably a fungi from the Genus *Trichoderma, Aspergillus, Penicillium, Aureobasilium* and *Fusarium*.

In one embodiment, said density-based separation method is selected from separation based on natural gravity, gravity-assisted phase separation, and centrifugation, wherein each of said separation based on natural gravity, gravity-assisted phase separation, and centrifugation, is performed alone or in combination with a decantation, aspiration or other mechanical harvesting method.

In one embodiment, steps b) and c) are performed within the same reaction vessel.

In one embodiment, step c) and/or d) results in a lipid-phase, and a hydrolysate of said oleaginous microorganism. In some instances, step c) and/or d) may additionally also result in a residual biomass of said oleaginous microorganism which residual biomass is different from said lipid phase and said hydrolysate. In one embodiment, said method involves a repeated performance of steps b)-d), and wherein said hydrolysate of said oleaginous microorganism resulting from steps c) and/or d) is reused/recycled for performing step b).

In one embodiment, steps b)-d) are performed 2-n-times, wherein n is an integer, selected from 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

In one embodiment, said hydrolase is obtained from a fungus that has been cultured in the presence of an inducing system, wherein, preferably, said inducing system is a component of said oleaginous microorganism, more preferably one or several cell-wall components of said oleaginous microorganism used for producing microbial lipids, so as to obtain a hydrolase preparation that allows a lysis of said oleaginous microorganism's cell wall. In one embodiment, said inducing system is said residual biomass of said oleaginous microorganism produced during step c) and/or d), or is a part or component of said residual biomass.

In one embodiment, said medium used in step b) is a nitrogen-rich medium.

In one embodiment, said medium used in step b) further comprises a nitrogen source, preferably in the form of a protein hydrolysate, such as peptone, tryptone or other peptidic hydrolysate, wherein, preferably, said peptidic hydrolysate comprises animal tissue, plant tissue and/or components of said oleaginous microorganism.

In one embodiment, said protease, if present, is selected from proteases produced by *Aspergillus* sp., *Streptomyces* sp. or *Bacillus* sp.

In one embodiment, said hydrolase obtained from said fungus is prepared separately (from performing steps b)-c) of the present invention) and is used in step c) as a liquid preparation directly obtained from culturing said fungus, or as a freeze-dried preparation that is subsequently reconstituted in solution to be used in step c).

In one embodiment, said hydrolase contains one or several activities for example, but not limited to enzyme activities selected from cellulase, xyloglucanase, beta-glucosidase, mannanase, xylanase, and laminarinase enzyme activities.

In one embodiment, said method is performed in fed-batch, semi-continuous or continuous mode, wherein preferably, said method involves the repeated addition of an organic acid, as defined above, wherein, preferably, said method involves the repeated addition of organic acid, e.g. acetic acid or acetate.

It should be noted that the composition of the microbial lipids produced in step b) can be influenced by the conditions employed in this step. Typical conditions for step b) are as follows:

In one embodiment, the growth temperature during step b) is in a range from 5° C. to 32° C. In one embodiment of step b), the pH is in the range of from 5-8. In a preferred embodiment of step b), the growth temperature during step b) is in a range from 10° C. to 28° C. In a further preferred embodiment of step b), the pH is in the range of from 5.5-7.5. In yet a further preferred embodiment, the growth temperature during step b) is in a range from 5° C. to 32° C., and the pH is in the range of from 5-8. In a particularly preferred embodiment, the growth temperature during step b) is in a range from 10° C. to 28° C., and the pH is in the range of from 5.5-7.5.

In one embodiment, the method is particularly suitable for producing lipids with content of >60% unsaturated fatty acids with respect to the total fatty acids content and/or a pour point in a range of <10° C., e.g. from 9° C. to 5° C., such as for example approximately 5° C. This is particularly so, if the following parameters are chosen for step b):

growing said oleaginous microorganism in a medium comprising a carbon source and an organic acid under the following conditions: carbon source=glucose; organic acid=acetic acid+addition of crotonic acid; temperature 10-15° C., dissolved oxygen content 10-30% and addition of crotonic acid (4-10% of total organic acid), and thereby allowing said oleaginous microorganism to produce microbial lipids, which are characterized by a "pour point" in a range of <10° C., e.g. from 9° C. to 5° C., such as for example ca. 5° C., and/or an unsaturated fatty acid content of >60% with respect to the total fatty acid content. The "pour point", as used herein, is typically determined in accordance with any of the following standards: DIN51597, DIN EN 23015: 1994-05, DIN ISO 3015:1982-10, DIN ISO 3016:1982-10, ASTM D97, ASTM D5985, preferably using DIN ISO 3016.

Oleaginous microorganisms are known to a person skilled in the art. In accordance with one embodiment according to the present invention, the oleaginous microorganism that is used in the method according to the present invention is an oleaginous yeast. In one embodiment, said oleaginous yeast is selected from a genus group comprising the genera *Rhodospirillum, Trichosporon, Rhodosporidium, Rhodosporon, Candida, Cryptococcus, Lipomyces, Yarrowia, Rhodotorula, Apiotrichum* and *Cutaneotrichosporon*. In a preferred embodiment, said oleaginous microorganism/yeast is *Cutaneotrichosporon oleaginosum* (*C. oleaginosum*).

During culturing of microorganisms for the production of microbial oils, there is an offset either in lipid productivity or biomass productivity for production of microbial oil. Conventionally lipids are generated in a two phase system comprising a first step for biomass production under non-limiting conditions, followed by a nutrient limiting phase during, which biomass growth is stopped and only lipids are accumulated. Under these conditions lipid productivity does not exceed 70% w/w. Surprisingly, this invention discloses a completely new route for lipid production wherein biomass growth and lipid accumulation can be achieved simultaneously.

This provides an option for biomass and lipid yield exceeding 200 g $L^{-1}$ biomass containing in excess of 85% lipid w/w. In one embodiment, the oleaginous microorganism is grown in a medium comprising a carbon source and an organic acid, as defined further above. Depending on the pH at which said medium is, the organic acid is dissociated/deprotonated in which case it is present as salt/carboxylate anionic form-, or it is non-dissociated in which case it is present as organic acid in its protonated form. The medium in which said oleaginous microorganism is grown comprises a carbon source together with such carboxylic acid/carboxylate. Without wishing to be bound by any theory, the present inventors believe that the presence of organic acid, e.g. acetic acid/acetate allows to increase the lipid productivity, whereas the presence of a carbon source allows an increase in the total biomass. It should be noted that the "carbon source" and the organic acid, as defined above, are two different entities which are different from each other. In one embodiment, the carbon source is selected from the group comprising fatty acids, amino acids, carbohydrates, preferably monosaccharides, preferably pentoses or hexoses, more preferably glucose, xylose, mannitol; oligosaccharides; hydrolysates of animal tissues, plant tissues or of microorganisms; and combinations of any of the foregoing, wherein more preferably, said carbon source is glucose. Said glucose may be used alone or may e.g. be used in combination with suitable hydrolysates, such as peptone, tryptone etc.

In one embodiment, the hydrolysate is an algal hydrolysate, a lignocellulosic hydrolysate, a vegetable hydrolysate, a marine biomass hydrolysate, such as a hydrolysate of marine macro- and micro-algae, a corn hydrolysate, a wheat hydrolysate or other hydrolysate. In some embodiments of the method according to the present invention which involve a recycling step, the hydrolysate may also be a microbial hydrolysate, e.g. a yeast hydrolysate, derived from hydrolysis of the oleaginous microorganism, e.g. yeast itself, preferably after such hydrolysate has been used to produce lipids.

The growth of the oleaginous microorganism in a suitable medium comprising a carbon source and an organic acid as defined above, allows said oleaginous microorganism to produce microbial lipids. However, typically, these microbial lipids are still contained within the cells of the oleaginous microorganism and, for a subsequent recovery, therefore need to be made accessible. Embodiments of the present invention therefore provide for an enzymatic treatment of the grown oleaginous microorganism that makes the produced microbial lipids amenable or accessible to a subsequent recovery from the culture vessel. It should be noted that the method according to the present invention involves a purely enzymatic treatment of the grown oleaginous microorganism without having to rely on any pretreatment steps, e.g. chemical pretreatment steps, or subsequent or concomitant extraction of said lipids using a solvent. Examples of such chemical pretreatment steps or subsequent or concomitant extraction steps are solvent-based extraction or chemicals based demulsification. Such excluded pretreatment steps may, however, also be physical steps, such as temperature changes, pressure changes, centrifugation, sonification, irradiation, etc.

The term "chemicals based demulsification", as used herein refers to the exposure of the grown biomass to a demulsifier so as to enable the breaking of any emulsion (that may have formed).

In accordance with embodiments of the invention, the method does not involve a solvent-based extraction, chemicals based demulsification or other treatments, such as temperature shock, chemical treatment or high-pressure homogenization or ultrasound homogenization. These would potentially add to the costs or the hazardous character of the method and are avoided by the present invention. The present inventors have surprisingly found that such harsh treatment steps are not strictly necessary.

In embodiments according to the present invention, subsequently, the produced microbial lipids are harvested using a density-based separation method. In its simplest form, such density-based separation method may be a process wherein the culture of the oleaginous microorganism is simply allowed to stand for a period of time as a result of which the lipid phase will separate from an aqueous phase due to different densities and/or solubility in water. This may be combined with a subsequent decantation, aspiration or other mechanical removal of the lipid-phase from the culture. In other embodiments, separation may occur by way of a gravity-assisted phase separation, by way of a centrifugation, alone or in combination with a subsequent mechanical removal or the lipid-phase, e. g. a decantation or aspiration.

In one embodiment, during step c), the "purely enzymatic treatment of said grown oleaginous microorganism without any solvent-based extraction" is a treatment of said microorganism with a hydrolase. Preferably, such hydrolase is obtained from another microorganism, preferably from a fungus, more preferably from a filamentous fungus.

In one embodiment, the fungus is selected from the Genus *Trichoderma, Aspergillus, Penicillium, Aureobasilium* and *Fusarium*. In a more preferred embodiment, the filamentous fungus is *Trichoderma reesei*, because this has proved to produce a particularly efficient hydrolase that allows a lysis of the cell wall of the oleaginous microorganism. In one embodiment, said hydrolase is obtained from a fungus, preferably a filamentous fungus that has been cultured in the presence of an inducing system, wherein, preferably, said inducing system is a component of said oleaginous microorganism, preferably one or several cell-wall components of said oleaginous microorganism used for producing microbial lipids, so as to obtain a hydrolase preparation that allows a lysis of said oleaginous microorganism's cell wall. In one embodiment, said inducing system is said residual biomass that may be produced during steps c) und d), or components thereof. Preferably, such hydrolase is produced by culturing said filamentous fungus in the presence of cell wall fragments of said oleaginous microorganism. Without wishing to be bound by any theory, the present inventors believe that exposure of the filamentous fungus, e. g. *T. reesei*, to the presence of such cell wall component of said oleaginous microorganism allows such filamentous fungus to produce exactly the suitable enzyme(s) to complete the lysis of the cell-walls of the oleaginous microorganism. In a particularly preferred embodiment, a filamentous fungus from the genus *Trichoderma* is used, e. g. *Trichoderma reesei*, and in a particularly preferred embodiment, a mutant of *Trichoderma reesei* is used, such as the mutant having the ATCC deposition number(s) 56765 and 13631. Once the filamentous fungus has been cultivated, the resultant culture may be further processed, such as concentrated, and the biomass of the fungus itself is removed, and the resultant supernatant may be used in such a form, or it may be freeze-dried and kept for storage and subsequent reconstitution in an appropriate aqueous solution. Again, without wishing to be bound by any theory, the present inventors believe that the hydrolase thus produced may represent a combination of various enzymatic activities, e. g. a cellulase, xyloglucanase, β-glucosidase, mannanase, xylanase and laminarinase, and, possibly, others.

In one embodiment, according to the present invention, steps b) and c) are performed in the same reaction vessel. This is herein also something referred to as a "one-pot-method" or "one-pot-process". In this embodiment, the method according to the present invention may be considered a one-pot process for the manufacture of microbial lipids. Typically, step c) and/or step d) results in a lipid-phase and a hydrolysate phase of the oleaginous microorganism, and the method, preferably, involves a repeated performance of steps b)-d). In such embodiment, the hydrolysate resulting from steps c) and/or d) may be reused/recycled for performing step b). In such an embodiment, the microorganism hydrolysate resulting from steps c) and/or d) is re-fed into the medium used in step b) and may act as the carbon source or as an additional carbon source (additional to the carbon source that was chosen and present initially). Embodiments, wherein, in steps b)-d) side products are reused/recycled, e.g. wherein products resulting from steps c) and/or d) are reused/recycled in step b), avoid the occurrence of waste-products. Such embodiments may therefore herein also sometimes be referred to as a "waste-free process" or "waste-free method".

In one embodiment, in particular where the hydrolysate of the oleaginous microorganism is reused/recycled for performing step b), the method according to the present invention is a method wherein steps b)-d) are performed repeatedly, preferably twice, three times, four times, five times, six times, seven times, eight times, nine times, ten times, or possibly 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or even 50-times 50. In one embodiment, steps b)-d) are performed 2-3 times. A repeated recycling allows to make efficient use of the various media involved and avoids the production of excessive waste, since the products resulting from the process, such as a hydrolysate of the oleaginous microorganism, is reused as a starting medium to grow such oleaginous microorganism.

In one embodiment, the medium used in step b) further comprises a nitrogen source, preferably in the form of a protein hydrolysate, such as peptone, tryptone or other peptidic hydrolysate. Without wishing to be bound by any theory, the present inventors believe that the presence of such additional nitrogen source allows to increase the production of lipids and biomass, in total.

In one embodiment, the medium used in step b) is a nitrogen-rich medium. The term "nitrogen-rich medium", as used herein, refers to a medium in which the weight ratio of carbon to nitrogen (C:N) is <100, preferably ≤80, more preferably 25-80.

In one embodiment according to the present invention, the "purely enzymatic treatment" performed in step c) additionally involves the treatment of said microorganism with a protease (but still excludes a pretreatment, or solvent-based extraction or chemicals based demulsification). It should be noted that such protease, if and when used, follows or is combined with a treatment using the aforementioned hydrolase. Again, without wishing to be bound by any theory, the present inventors believe that the treatment involving a protease allows a separation of the produced lipids from any proteins associated therewith and therefore assists in the release of lipids. In one embodiment, the protease is selected from the group of proteases produced by *Aspergillus* sp., *Streptomyces* sp. or *Bacillus* sp.

In one embodiment, the method according to the present invention is performed in a fed-batch manner or in a continuous mode-manner, with a fed-batch mode being preferred. Preferably, if the method according to the present invention is performed in a fed-batch manner, for the performance of step b) defined amounts of said carbon source, as defined above, and of said organic acid are added repeatedly, preferably as many times as the step b) is performed. In a preferred embodiment, the concentration of organic acid during step b) should be kept at a concentration over the fermentation time in a range of from 30 to 100 mM, preferably 50 to 70 mM.

BRIEF DESCRIPTION OF THE FIGURES

Furthermore, reference is made to the figures, wherein

FIG. 17 shows a fatty acid profile of a yeast oil obtained after cultivating *C. oleaginosus* in media using 100% acetic acid.

FIG. 18 shows a fatty acid profile of yeast oil obtained after cultivating C. oleaginosus in medium using a mixture of 90% acetic acid and 10% isobutyric acid.

FIG. 19 shows a fatty acid profile of yeast oil obtained after cultivating C. oleaginosus in medium using a mixture of 90% acetic acid and 10% isovaleric acid.

FIG. 20 shows a fatty acid profile of yeast oil obtained after cultivating C. oleaginosus in medium using a mixture of 90% and 10% crotonic acid.

Moreover, reference is made to the following examples which are given to illustrate not to limit the present invention.

EXAMPLES 1.1. Maximizing Lipid Productivity

Example 1 (Sole Acetic Acid, Sole Glucose Fermentation for Comparison)

Figure 1:
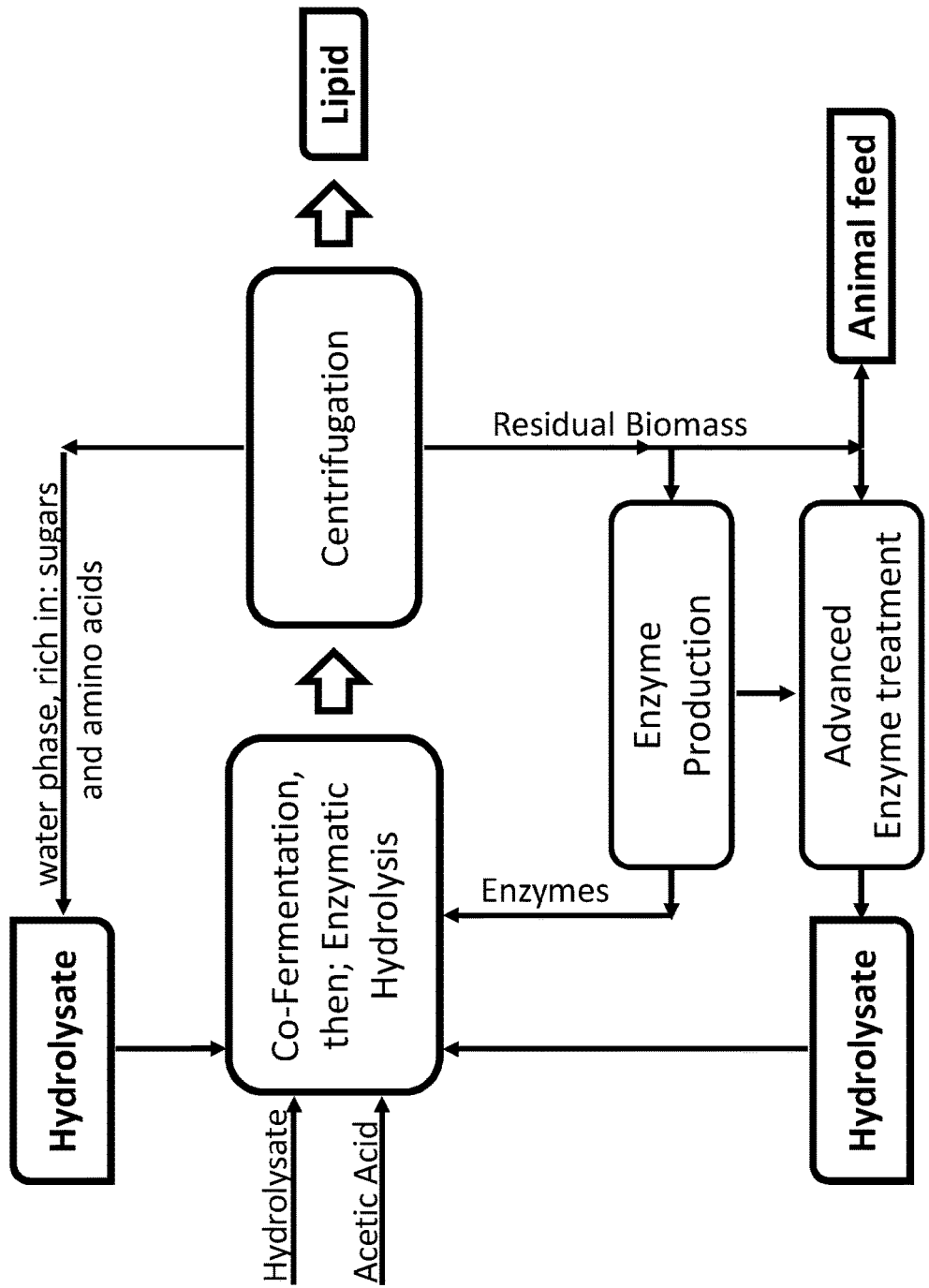
FIG. 1 shows the biomass flow involved in embodiments according to the present invention which involve a recycling of some of the products resulting from the performance of the method in particular resulting from a hydrolysis of the oleaginous microorganism.
Figure 2:
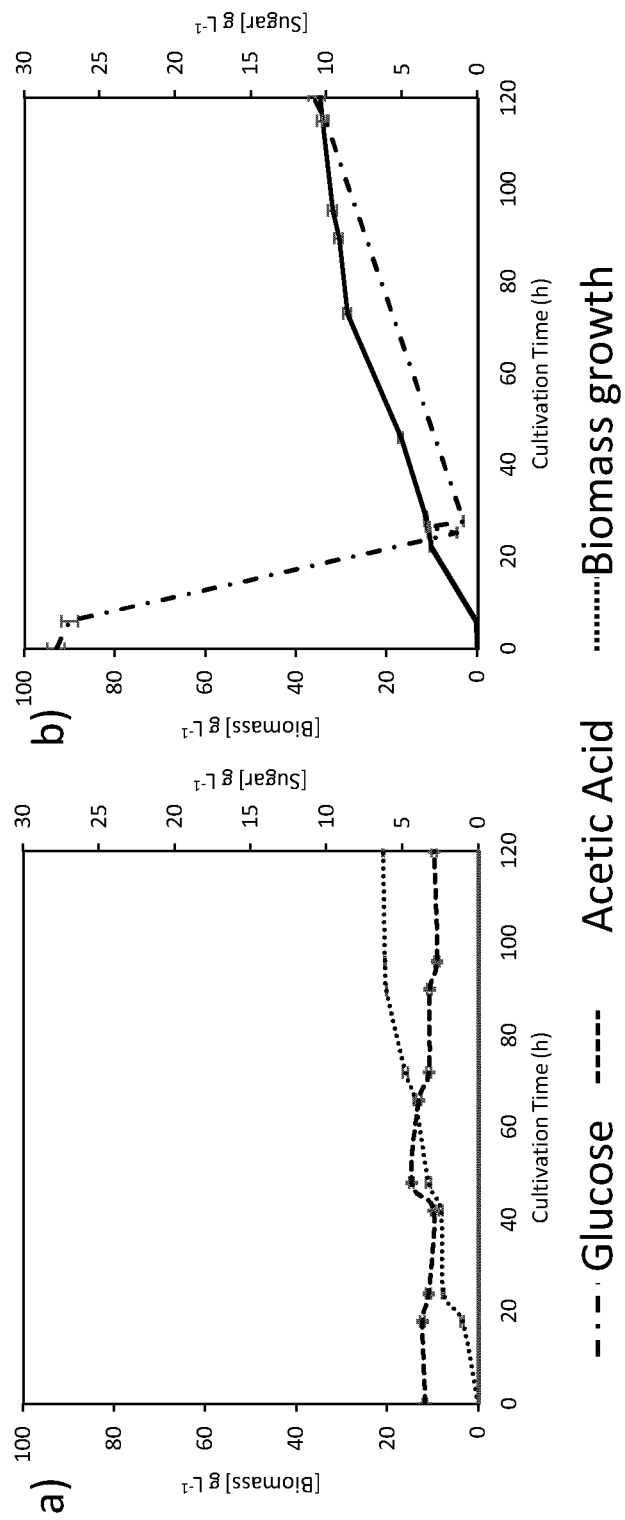
FIG. 2 shows the biomass growth and feed consumption over the fermentation time using different feeds (a) using acetic acid alone; (b) glucose alone.
Figure 10:
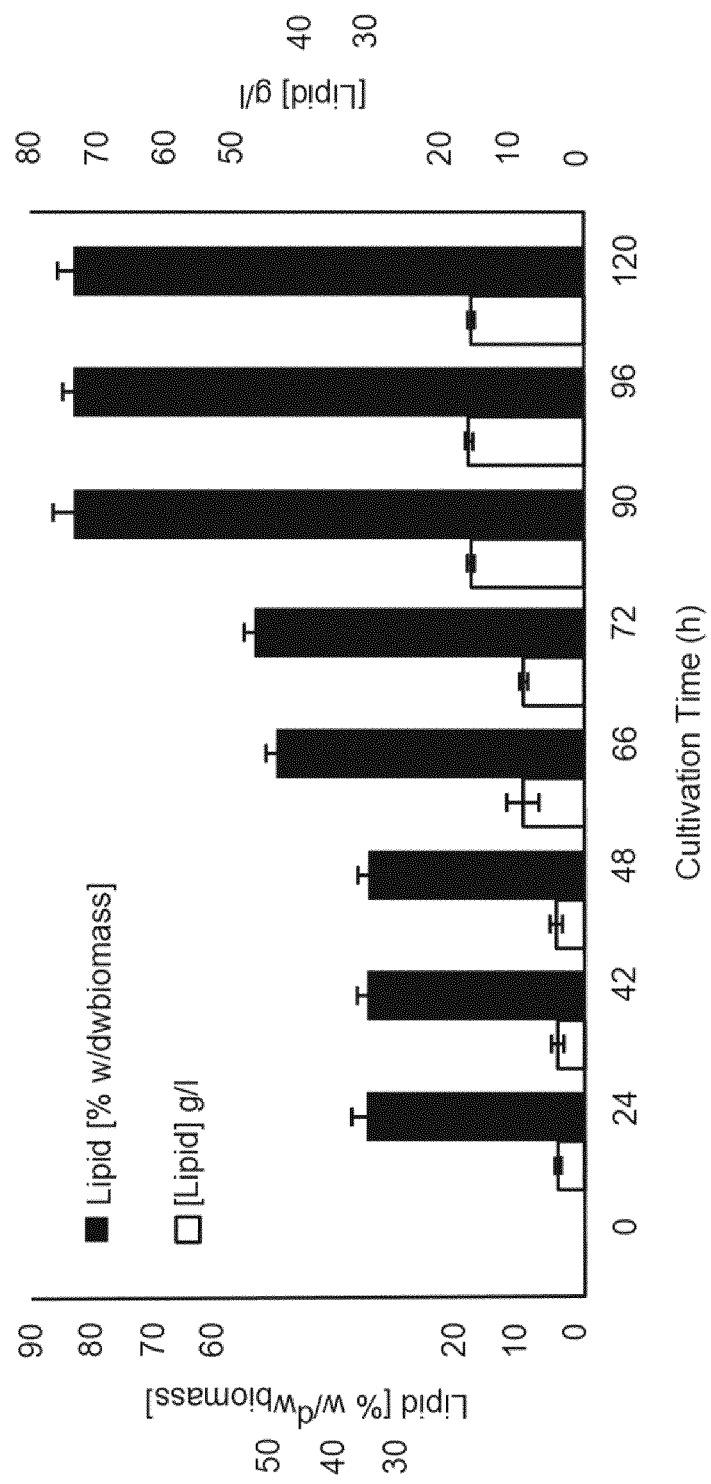
FIG. 10 shows the increase of lipid content and productivity, measured as $gL^{-1}$ (light gray columns) and in % w/dw biomass (weight percent/per dry weight biomass) (dark gray columns), versus fermentation time using only acetic acid (fermentation was performed in a 2-litre flask at a temperature of 28° C., pH 6.5 and $pO_2 \geq 50\%$.

Various fermentation setups (sole acetic acid, sole glucose, co-fermentation of acetic acid and glucose) with nitrogen limited and rich media conditions have been investigated. In the regard to sole-substrate fermentation, sole-glucose fermentation (Medium A) (FIG. 2b) shows a higher biomass productivity over the sole acetic acid (Medium B) (FIG. 2a). However, sole acetic acid fermentation provides a slightly higher lipid productivity (FIG. 10) over the sole glucose fermentation set-up, providing 0.13 g $L^{-1}$ $h^{-1}$ [Biomass 22 g $L^{-1}$, lipid 72% ($w_{lipid}/^d w_{biomass}$)] and 0.09 g $L^{-1}$ $h^{-1}$ [Biomass 34 g $L^{-1}$, Lipid 45% ($w_{lipid}/^d w_{biomass}$)] respectively.

Moreover, conventional lipid production with oleaginous organisms is a two stages process, where the first step provides for biomass formation under non-limiting conditions (exponential growth phase), the second lipid induction step (nutrient limitation phase) affords high intracellular lipid accumulation at stagnant cell counts. The present inventors' data demonstrate for the first time that co-fermentation of sugars and an organic acid, e.g. acetic acid, can provide for simultaneous biomass and lipid formation without the need for metabolic stressors, such as nitrogen limitation. Current fermentation strategy has achieved biomass and lipid production rate (Biomass 240 g $L^{-1}$, Lipid 87% (w/w)) superseding any previously published data.

Strain: *Cutaneotrichosporon oleaginosus* (ATCC 20509) was cultivated in Erlenmeyer flasks containing YPD media broth (10 g·$L^{-1}$ yeast extract, 20 g·$L^{-1}$ peptone and 20 g·$L^{-1}$ glucose) containing antibiotics (10 mg $L^{-1}$ ampicillin, 10 mg $L^{-1}$ kanamycin and 12 mg $L^{-1}$ tetracycline). The flasks were incubated in a rotary shaker at 100 rpm and a temperature of 28° C. for 2 days, then it was used as inoculum Medium A: glucose 30 g $L^{-1}$, yeast extract 0.5 g $L^{-1}$, NH$_4$Cl 0.5 g $L^{-1}$, KH$_2$PO$_4$ 2.4 g $L^{-1}$, Na$_2$HPO$_4$·12H$_2$O 0.9 g $L^{-1}$, MgSO$_4$·7H$_2$O 1.5 g $L^{-1}$, FeCl$_3$·6H$_2$O 0.08 g $L^{-1}$, ZnSO$_4$·7H$_2$O 0.01 g $L^{-1}$, CaCl$_2$·2H$_2$O 0.1 g $L^{-1}$, MnSO$_4$·5H$_2$O 0.1 mg $L^{-1}$, CuSO$_4$·5H$_2$O 0.1 mg $L^{-1}$, Co(NO$_3$)$_2$·6H$_2$O 0.1 mg $L^{-1}$.

Medium B: yeast extract 0.5 g $L^{-1}$, sodium acetate 4.1 g $L^{-1}$, NH$_4$Cl 0.5 g $L^{-1}$, KH$_2$PO$_4$ 2.4 g $L^{-1}$, Na$_2$HPO$_4$·12H$_2$O 0.9 g $L^{-1}$, MgSO$_4$·7H$_2$O 1.5 g $L^{-1}$, FeCl$_3$·6H$_2$O 0.08 g $L^{-1}$, ZnSO$_4$·7H$_2$O 0.01 g $L^{-1}$, CaCl$_2$·2H$_2$O 0.1 g $L^{-1}$, MnSO$_4$·5H$_2$O 0.1 mg $L^{-1}$, CuSO$_4$·5H$_2$O 0.1 mg $L^{-1}$, Co(NO$_3$)$_2$·6H$_2$O 0.1 mg $L^{-1}$.

2-L Bioreactor: Fed-Batch cultivation of *T. oleaginosus* was performed in a 2-L bioreactor (INFORS HT system, Switzerland) with a working volume of 1 L of corresponding media. The temperature was kept constant at 28° C., and the pH of the bioreactor was adjusted to pH 6.5±0.2 with 1 M NaOH or 1M HCl (incase of glucose fermentation) and 50% acetic acid (in the case of AA fermentation). Stirring (350-1000 rpm) and aeration (1.0-2.0 NL/V of air) were regulated automatically to maintain dissolved oxygen at above of 50%. Foam was prevented by the addition of 0.01% (V/V) of an antifoam agent (Antifoam 204, Sigma Aldrich).

Example 2 (Co-Fermentation of Acetic Acid and Glucose in Limited Nitrogen Medium)

Figure 3:
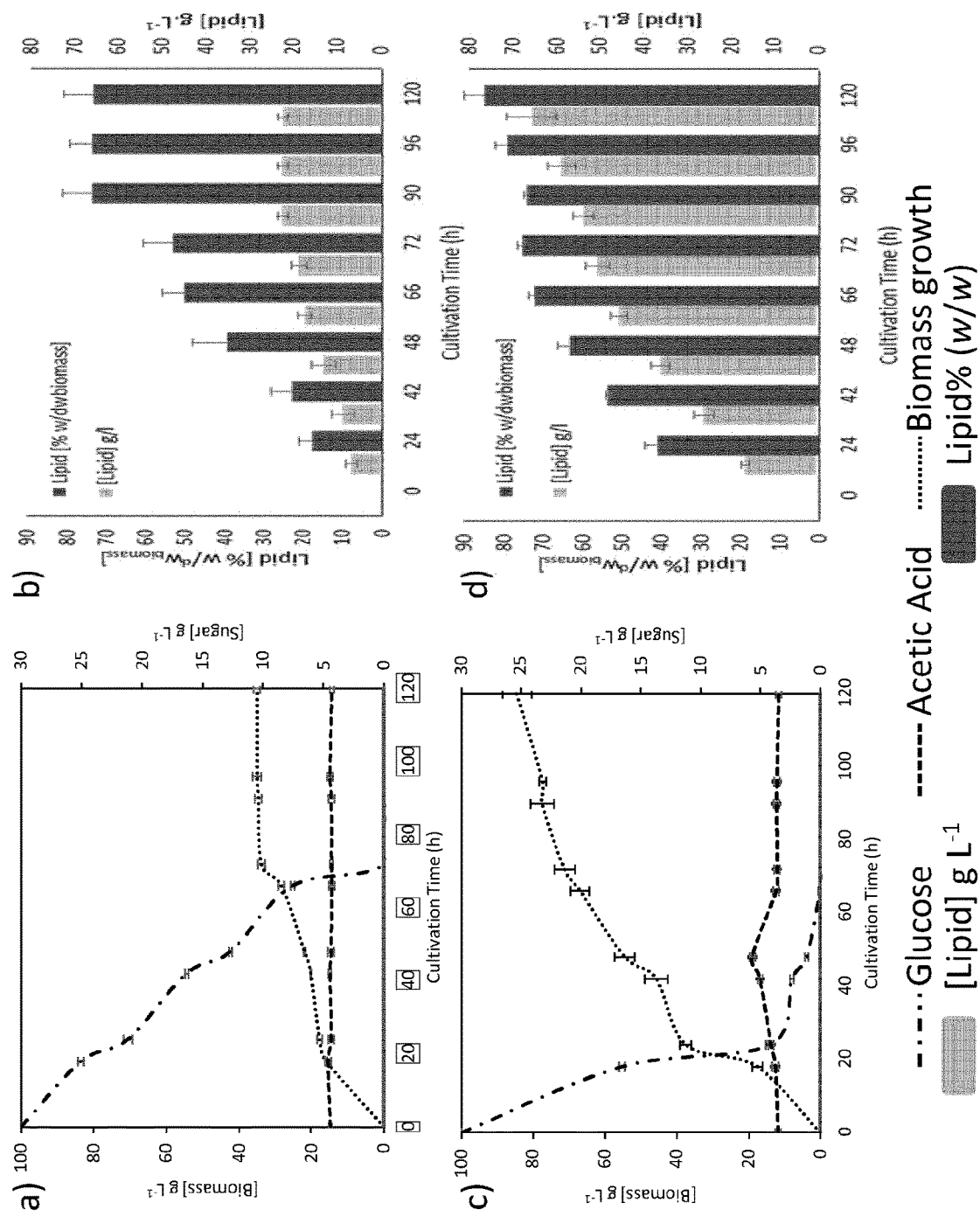
FIG. 3 shows the biomass growth feed consumption and lipid accumulation over the fermentation time using different feeds (a) biomass growth and substrate combustion versus fermentation time using both acetic acid and glucose co-fermentation in limited nitrogen medium; (b) Lipid accumulation over versus fermentation over time using both acetic acid and glucose co-fermentation in limited nitrogen medium; (a) biomass growth and substrate combustion versus fermentation time using both acetic acid and glucose co-fermentation in nitrogen rich-medium; and (d) Lipid accumulation over versus fermentation time using acetic acid and glucose co-fermentation in nitrogen rich-medium

In comparison, the co-fermentation of glucose and acetic acid in limited nitrogen medium (Medium C) (FIG. 3a) reached a biomass of 20 g $L^{-1}$ with a lipid content of 20% ($w_{lipid}/^d w_{biomass}$) in the first 24 hours)] (FIG. 3b). Whereas at the same time point, individual glucose and acetic acid fermentation biomass reached only 10 g $L^{-1}$ with a lipid content of 12% ($w_{lipid}/^d w_{biomass}$) and 5 g $L^{-1}$ biomass with 30% ($w_{lipid}/^d w_{biomass}$) lipid respectively. This corresponds to a lipid productivity of 0.2 g $L^{-1}$ $h^{-1}$ from first day compared to 0.075 g $L^{-1}$ $h^{-1}$ with respect to individual glucose and acetic acid batch fermentation.

The lipid productivity, under limited nitrogen conditions, decreased thereafter to 0.18 g $L^{-1}$ $h^{-1}$ [Biomass 43 g $L^{-1}$, lipid 73.5% ($w_{lipid}/^d w_{biomass}$)] by the fifth fermentation day. The calculated carbon: carbon efficiency was 0.22 g $g^{-1}$ lipid per total carbon. This decrease can be attributed to the limited nitrogen resources.

Strain: *Cutaneotrichosporon oleaginosus* (ATCC 20509) was cultivated in Erlenmeyer flasks containing YPD media broth (10 g·$L^{-1}$ yeast extract, 20 g·$L^{-1}$ peptone and 20 g·$L^{-1}$ glucose) containing antibiotics (10 mg $L^{-1}$ ampicillin, 10 mg $L^{-1}$ kanamycin and 12 mg $L^{-1}$ tetracycline). The flasks were incubated in a rotary shaker at 100 rpm and a temperature of 28° C. for 2 days, then it was used as inoculum.

Media C: glucose 30 g $L^{-1}$, yeast extract 0.5 g $L^{-1}$, sodium acetate 4.1 g $L^{-1}$, NH$_4$Cl 0.5 g $L^{-1}$, KH$_2$PO$_4$ 2.4 g $L^{-1}$, Na$_2$HPO$_4$·12H$_2$O 0.9 g $L^{-1}$, MgSO$_4$·7H$_2$O 1.5 g $L^{-1}$, FeCl$_3$·6H$_2$O 0.08 g $L^{-1}$, ZnSO$_4$·7H$_2$O 0.01 g $L^{-1}$, CaCl$_2$·2H$_2$O 0.1 g $L^{-1}$, MnSO$_4$·5H$_2$O 0.1 mg $L^{-1}$, CuSO$_4$·5H$_2$O 0.1 mg $L^{-1}$, Co(NO$_3$)$_2$·6H$_2$O 0.1 mg $L^{-1}$.

2-L Bioreactor: Fed-Batch cultivation of *T. oleaginosus* was performed in a 2-L bioreactor (INFORS HT system, Switzerland) with a working volume of 1 L of corresponding media. The temperature was kept constant at 28° C., and the pH of the bioreactor was adjusted to pH 6.5±0.2 with 1 M NaOH or 1M HCl (incase of glucose fermentation) and 50% acetic acid (in the case of AA fermentation). Stirring (350-1000 rpm) and aeration (1.0-2.0 NL/V of air) were regulated automatically to maintain dissolved oxygen at above of 50%. Foam was prevented by the addition of 0.01% (V/V) of an antifoam agent (Antifoam 204, Sigma Aldrich).

Example 3 (Co-Fermentation of Acetic Acid and Glucose in Rich Nitrogen Medium)

Figure 11:
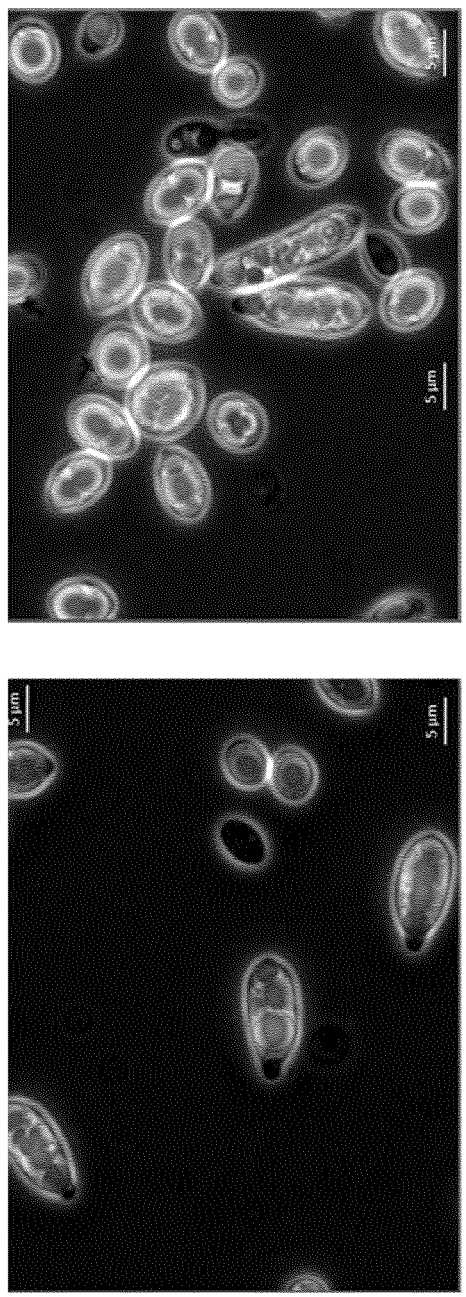
FIG. 11 shows fluorescence microscope images showing a remarkable increase in the cell volume and lipid content for: Glucose-based fermentation in minimal nitrogen medium (on the left) and co-fermentation in nitrogen rich medium (on the right).

Interestingly, fermentation based on nitrogen-rich medium (medium D) enhanced the lipid productivity, by the first day, to 0.67 g $L^{-1}$ $h^{-1}$ (FIGS. 3c & 3d). Notably, nitrogen-rich medium based co-fermentation shows a simultaneous formation of both biomass and intracellular lipids immediately after the start of the fermentation. Under these conditions a lipid content in excess of 70% ($w_{lipid}/^d w_{biomass}$) was achieved by the second day of fermentation. Thereafter, the lipid yield increased further reaching 85% ($w_{lipid}/^d w_{biomass}$) after 120 h. This is the highest intracellular lipid yield ever observed with oleaginous yeasts. Under these experimental conditions the biomass yield also continued to increase linearly without levelling out into a plateau phase (FIG. 3c). The applied acetic acid and sugar co-fermentation protocol improved lipid productivity up to 0.53 g $L^{-1}$ $h^{-1}$ [Biomass 84 g $L^{-1}$, 84.9% ($w_{lipid}/^d w_{biomass}$)]. However, carbon: carbon efficiency was 0.24 g $g^{-1}$ lipid per total carbon. Confirmatory, fluorescence microscope imaging indicated a remarkable increase in the cell volume and lipid content (FIG. 11).

Presumably, and without wishing to be bound by any theory, acetic acid can be assimilated from media and converted directly into acetyl-CoA, a general platform metabolite associated with cell growth, lipid biosynthesis and energy metabolism. This transformation is catalyzed by acetate-CoA ligase, which has previously been reported in a transcriptomic analysis of C. oleaginosus. Therefore, acetate-CoA ligase could be an essential enzyme activity leading to the high lipid content associated with a short-cut into the lipid biosynthesis pathway, independent of the relative C: N ratio as reported for sugar based fermentations.

Specifically, acetate-CoA is a central TCA intermediate linked with cellular homeostasis and growth. However, the present inventors' data with using only acetic acid (i.e. with no separate carbon source) indicate that acetate is preferentially channeled in fatty acid biosynthesis and does not ensure cell propagation. In that regard, it is essential to clarify whether biomass production can be induced in parallel with lipid biosynthesis. Concurrent biomass and lipid formation is a key factor for the economic feasibility of the process. In that regard the co-fermentation of a carbon source and an organic acid, e.g. of a sugar and acetic acid, appears to be the most efficient procedure to initiate both rapid biomass propagation and lipid accumulation.

Strain: *Cutaneotrichosporon oleaginosus* (ATCC 20509) was cultivated in Erlenmeyer flasks containing YPD media broth (10 g·$L^{-1}$ yeast extract, 20 g·$L^{-1}$ peptone and 20 g·$L^{-1}$ glucose) containing antibiotics (10 mg $L^{-1}$ ampicillin, 10 mg $L^{-1}$ kanamycin and 12 mg $L^{-1}$ tetracycline). The flasks were incubated in a rotary shaker at 100 rpm and a temperature of 28° C. for 2 days, then it was used as inoculum.

Media D: glucose 30 g $L^{-1}$, yeast extract 0.5 g $L^{-1}$, peptone 5 g·$L^{-1}$, sodium acetate 4.1 g $L^{-1}$, $NH_4Cl$ 0.5 g $L^{-1}$, $KH_2PO_4$ 2.4 g $L^{-1}$, $Na_2HPO_4·12H_2O$ 0.9 g $L^{-1}$, $MgSO_4·7H_2O$ 1.5 g $L^{-1}$, $FeCl_3·6H_2O$ 0.08 g $L^{-1}$, $ZnSO_4·7H_2O$ 0.01 g $L^{-1}$, $CaCl_2·2H_2O$ 0.1 g $L^{-1}$, $MnSO_4·5H_2O$ 0.1 mg $L^{-1}$, $CuSO_4·5H_2O$ 0.1 mg $L^{-1}$, $Co(NO_3)_2·6H_2O$ 0.1 mg $L^{-1}$.

2-L Bioreactor: Fed-Batch cultivation of *T. oleaginosus* was performed in a 2-L bioreactor (INFORS HT system, Switzerland) with a working volume of 1 L of corresponding media. The temperature was kept constant at 28° C., and the pH of the bioreactor was adjusted to pH 6.5±0.2 with 1 M NaOH or 1M HCl (incase of glucose fermentation) and 50% acetic acid (in the case of AA fermentation). Stirring (350-1000 rpm) and aeration (1.0-2.0 NL/V of air) were regulated automatically to maintain dissolved oxygen at above of 50%. Foam was prevented by the addition of 0.01% (V/V) of an antifoam agent (Antifoam 204, Sigma Aldrich).

Example 4 (Co-Fermentation of Acetic Acid and Brown Algae Hydrolysate Medium)

Figure 4:
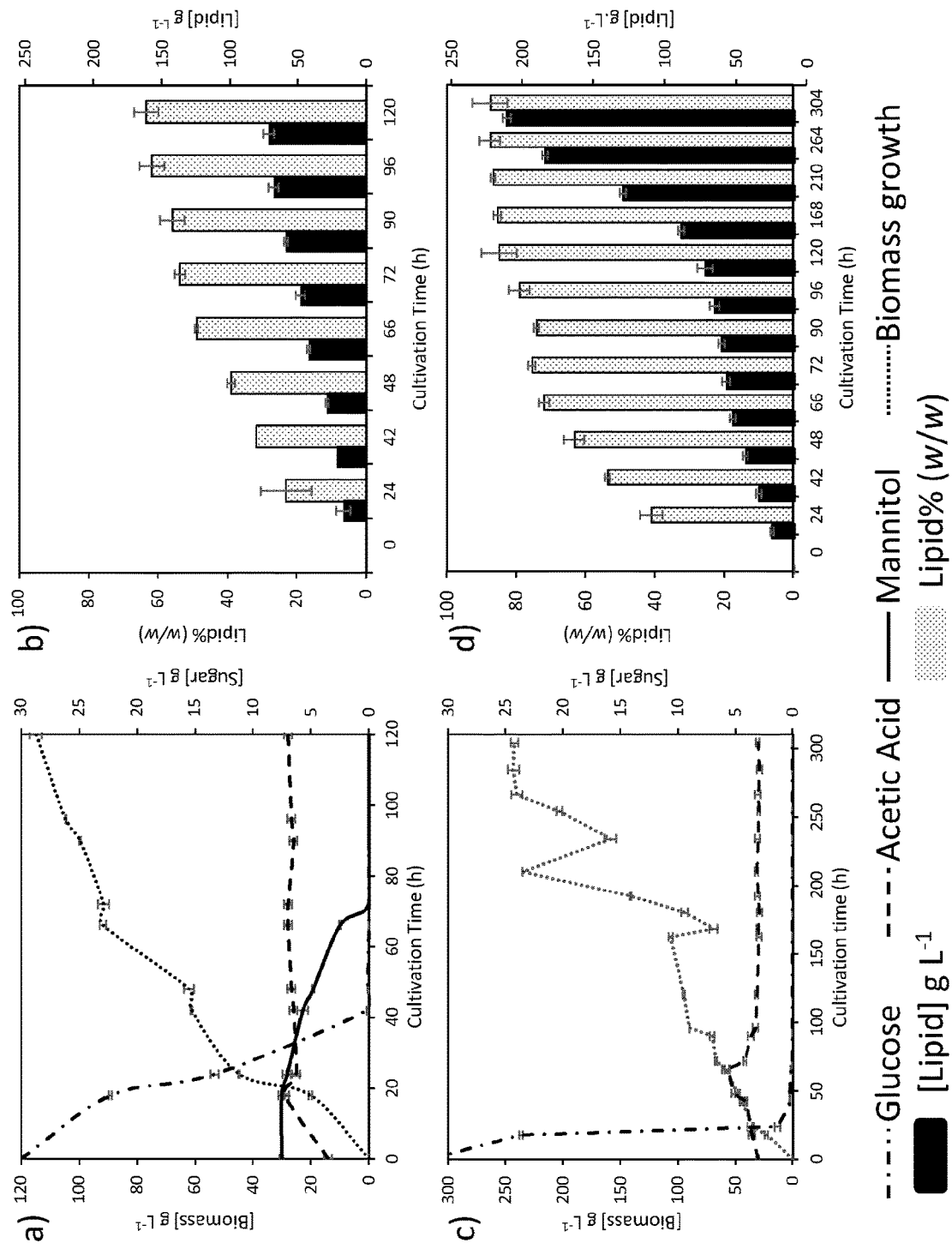
FIG. 4 shows the biomass growth, lipid accumulation and feed consuming over the fermentation time using different feeds (a) biomass growth and substrate combustion versus fermentation time using acetic acid and glucose co-fermentation together with *Laminaria digitata* hydrolysate (b) lipid accumulation and productivity of the culture of (a), expressed both in $gL^{-1}$ (light gray columns) and in % w/dw biomass (weight percent/per dry weight biomass)(dark gray columns); (c) biomass growth and substrate combustion versus fermentation time using acetic acid and glucose co-fermentation in nitrogen rich medium using a semi-continuous mode, i.e. wherein batches acetic acid are added repeatedly, e.g. 2-times, and biomass is harvested also repeatedly, e.g. 2 times; and (d) lipid accumulation and productivity versus fermentation time using acetic acid and glucose co-fermentation in nitrogen rich medium (again using a semi-continuous mode as in 3a)).

In the previous runs, a synthetic medium with pure glucose was applied. However, to avoid land use change impact of the co-fermentation, the marine brown algae biomass, *L. digitata*, served as sugar source. The previously reported *L. digitata* hydrolysate (reference: Masri, et al, Journal Appl. Energ., 2018, vol. 224, 1-12.) which contains, inter alia, glucose and mannitol as a carbon source, was used in a co-fermentation mode with acetic acid. The co-fermentation of *L. digitata* hydrolysate with acetic acid resulted in concurrent biomass and lipid formation without nutrient limitation. In addition, the biomass yield surpassed the intracellular lipid formation and due to the higher biomass yield, the total lipid productivity increased with 0.59 g $L^{-1}$ $h^{-1}$ [Biomass 114 g $L^{-1}$, 64% ($w_{lipid}/^d w_{biomass}$) lipid]. In this experimental setup, the carbon efficiency was 0.24 g $g^{-1}$ lipid per total carbon (FIGS. 4a & 4b).

Biofuel and oleochemicals production from converted land creates an inherent carbon debt by releasing 17 to 420 times more $CO_2$ than the annual greenhouse gas (GHG) reductions that these biofuels would provide. For example, biodiesel from oil palm, which was planted on converted peatland rainforest needs about 423 years to repay the created carbon debt. In contrast, biofuels and oleochemicals made from waste biomass (such as forestry waste) or abandoned agricultural lands incur little or no carbon debt. On other side, such a waste biomass or plantation of abandoned agricultural lands will create a high pressure on the food industry resulting in price increases due to land limitation.

In that regard the present inventors decided to use an enzymatic hydrolysate of the brown algae *L. digitata*, which they had previously demonstrated to be an excellent fermentation base for *C. oleaginous* (Masri, et al, Journal Appl. Energ., 2018, vol. 224, 1-12). Moreover, with regard to life cycle impact and process sustainability marine biomass such as brown algae hydrolysate from *L. digitata* is superior to any terrestrial biomass residues as it does not compete with agricultural activity, grows significantly faster than terrestrial equivalents and can be easily hydrolyzed without energy intensive physicochemical pretreatment which the terrestrial lingo-cellulosic biomass require.

Strain: *Cutaneotrichosporon oleaginosus* (ATCC 20509) was cultivated in Erlenmeyer flasks containing YPD media broth (10 g·$L^{-1}$ yeast extract, 20 g·$L^{-1}$ peptone and 20 g·$L^{-1}$ glucose) containing antibiotics (10 mg $L^{-1}$ ampicillin, 10 mg $L^{-1}$ kanamycin and 12 mg $L^{-1}$ tetracycline). The flasks were incubated in a rotary shaker at 100 rpm and a temperature of 28° C. for 2 days, then it was used as inoculum.

*L. digitata* hydrolysate: Enzymatic hydrolysis of the brown algae samples of *Laminaria digitata* (*L. digitata*) was conducted using 5-liter glass bottles (Schott) containing 20 liter of acetate buffer solution (50.0 mM, pH 5.0) and 60.0 g of biomass. The reactions were initiated by adding an enzyme solution and incubating at 50° C. while stirring at 400 rpm using magnetic stirrer for 72 hours. Reaction mixture was then centrifuged for 30 min at 8000 g, followed by cross-filtration (10 kDa membrane made from regenerated cellulose were used with the following parameters: inlet-pressure (P1) 2 bar, repentant-pressure (P2) 0.3-0.5 bar and permeate was open to atmospheric pressure. Flow-rates of repentant and permeate were ca. 2 L·min-1 and ca. 0.1 L·min-1 respectively. 0.2 μm filter capsules were installed at the outlet to sterilize the resulted hydrolysate).

2-L Bioreactor: Fed-Batch cultivation of *T. oleaginosus* was performed in a 2-L bioreactor (INFORS HT system, Switzerland) with a working volume of 1 L of corresponding media. The temperature was kept constant at 28° C., and the pH of the bioreactor was adjusted to pH 6.5±0.2 with 1 M NaOH or 1M HCl (incase of glucose fermentation) and 50% acetic acid (in the case of AA fermentation). Stirring (350-1000 rpm) and aeration (1.0-2.0 NL/V of air) were regulated automatically to maintain dissolved oxygen at above of 50%. Foam was prevented by the addition of 0.01% (V/V) of an antifoam agent (Antifoam 204, Sigma Aldrich).

Example 5 (Co-Fermentation of Acetic Acid and Glucose in Rich Nitrogen Medium—a Semi-Continuous Operation Mode)

With respect to economic efficiency, different operation modes were tested. Therefore, a semi-continuous and continuous operation modes were tested in an extended run time.

A semi-continuous operation mode with two harvesting points was run for about 12 days. The two partial harvesting points were conducted at time point of 162 and 234 h, where 40-50% (v/v) of the culture was removed from the bioreactor and replaced with fresh medium E. The initial co-fermentation with N-rich medium (Medium D) and acetic acid over an extended time period is depicted in FIGS. 4c & 4d. As observed previously, biomass and lipid formation was concurrently reaching lipid productivity of 0.57 gL$^{-1}$ h$^{-1}$ [biomass 106 gL$^{-1}$, Lipid 87% ($w_{lipid}/{}^dw_{biomass}$)], after 162 h. At this time, the first harvesting point had taken place by harvesting 40% (v/v) of the culture which results in decreasing the biomass concentration to 69 g L$^{-1}$.

In the subsequent 42 h of operation, the biomass concentration increased rapidly to reach 235 g L$^{-1}$. Moreover, the lipid content could surprisingly be maintained above 80% ($w_{lipid}/{}^dw_{biomass}$) with lipid productivity of 0.90 g L$^{-1}$ h$^{-1}$. This was the highest lipid productivity observed at this point of process optimization.

At time point of 234 h, the second harvesting step was performed, where 50% (v/v) of the culture volume was removed (FIG. 4c). Hence, the biomass concentration was decreased to 158 g L$^{-1}$. Interestingly, the biomass concentration was returned back to 240 g L$^{-1}$ with a lipid content of 87.5% ($w_{lipid}/{}^dw_{biomass}$) within the subsequent 32 h of fermentation.

At the end of operation, the total lipid productivity was of 0.8 g L$^{-1}$ h$^{-1}$ [biomass 240 g L$^{-1}$ Lipid 87.6% ($w_{lipid}/{}^dw_{biomass}$)]. However, the carbon efficiency with respect to lipid formation was 0.39 g g$^{-1}$. However, this productivity figure does not take the harvested culture amount in account, which surmounted to 80% (v/v) of the original culture volume. The extremely high cell density and lipid content could be visually manifested though an extremely high viscosity and hydrophobicity of the cells when they were exposed to water.

Strain: *Cutaneotrichosporon oleaginosus* (ATCC 20509) was cultivated in Erlenmeyer flasks containing YPD media broth (10 g·L$^{-1}$ yeast extract, 20 g·L$^{-1}$ peptone and 20 g·L$^{-1}$ glucose) containing antibiotics (10 mg L$^{-1}$ ampicillin, 10 mg L$^{-1}$ kanamycin and 12 mg L$^{-1}$ tetracycline). The flasks were incubated in a rotary shaker at 100 rpm and a temperature of 28° C. for 2 days, then it was used as inoculum.

Media D: glucose 30 g L$^{-1}$, yeast extract 0.5 g L$^{-1}$, peptone 5 g·L$^{-1}$, sodium acetate 4.1 g L$^{-1}$, NH$_4$Cl 0.5 g L$^{-1}$, KH$_2$PO$_4$ 2.4 g L$^{-1}$, Na$_2$HPO$_4$·12H$_2$O 0.9 g L$^{-1}$, MgSO$_4$·7H$_2$O 1.5 g L$^{-1}$, FeCl$_3$·6H$_2$O 0.08 g L$^{-1}$, ZnSO$_4$·7H$_2$O 0.01 g L$^{-1}$, CaCl$_2$·2H$_2$O 0.1 g L$^{-1}$, MnSO$_4$·5H$_2$O 0.1 mg L$^{-1}$, CuSO$_4$·5H$_2$O 0.1 mg L$^{-1}$, Co(NO$_3$)$_2$·6H$_2$O 0.1 mg L$^{-1}$, Media E: yeast extract, 1.0 g·L$^{-1}$, peptone 1.0 g·L$^{-1}$, NH$_4$Cl 0.5 g·L$^{-1}$, KH$_2$PO$_4$ 2.4 g·L$^{-1}$, Na$_2$HPO$_4$·12H$_2$O 0.9 g·L$^{-1}$ MgSO$_4$·7H$_2$O 1.5 g·L$^{-1}$, FeCl$_3$·6H$_2$O 0.08 g·L$^{-1}$, ZnSO$_4$·7H$_2$O 0.01 g·L$^{-1}$, CaCl$_2$·2H$_2$O 0.1 g·L$^{-1}$, MnSO$_4$·5H$_2$O 0.1 mg·L$^{-1}$, CuSO$_4$·5H$_2$O 0.1 mg·L$^{-1}$, Co(NO$_3$)$_2$·6H$_2$O 0.1 mg·L$^{-1}$.

2-L Bioreactor: Fed-Batch cultivation of *T. oleaginosus* was performed in a 2-L bioreactor (INFORS HT system, Switzerland) with a working volume of 1 L of corresponding media. The temperature was kept constant at 28° C., and the pH of the bioreactor was adjusted to pH 6.5±0.2 with 1 M NaOH or 1M HCl (in case of glucose fermentation) and 50% acetic acid (in case of AA fermentation). Stirring (350-1000 rpm) and aeration (1.0-2.0 NL/V of air) were regulated automatically to maintain dissolved oxygen at above of 50%. Foam was prevented by the addition of 0.01% (V/V) of an antifoam agent (Antifoam 204, Sigma Aldrich).

Example 6 (Co-Fermentation of Acetic Acid and Glucose in Rich Nitrogen Medium—a Continuous Operation Mode-Upscaling)

To validate the inventors' data at technically relevant scales, a co-fermentation in N-rich medium was conducted at a scale of 25 L. The fermentation was operated in a continuous mode by using a 50% (w/w) acetic acid as continuous dilution. As the yeast initiates significant acetic acid metabolism about 48 h after the start of the experimental run, there is an increasing dilution of the reactor volume as acetic acid feeding was carried out at a 50% (w/w) concentration. In that regard it has to be noted that with increasing acetic acid metabolism over the experimental time period the dilution factor increased consecutively.

Figure 5:
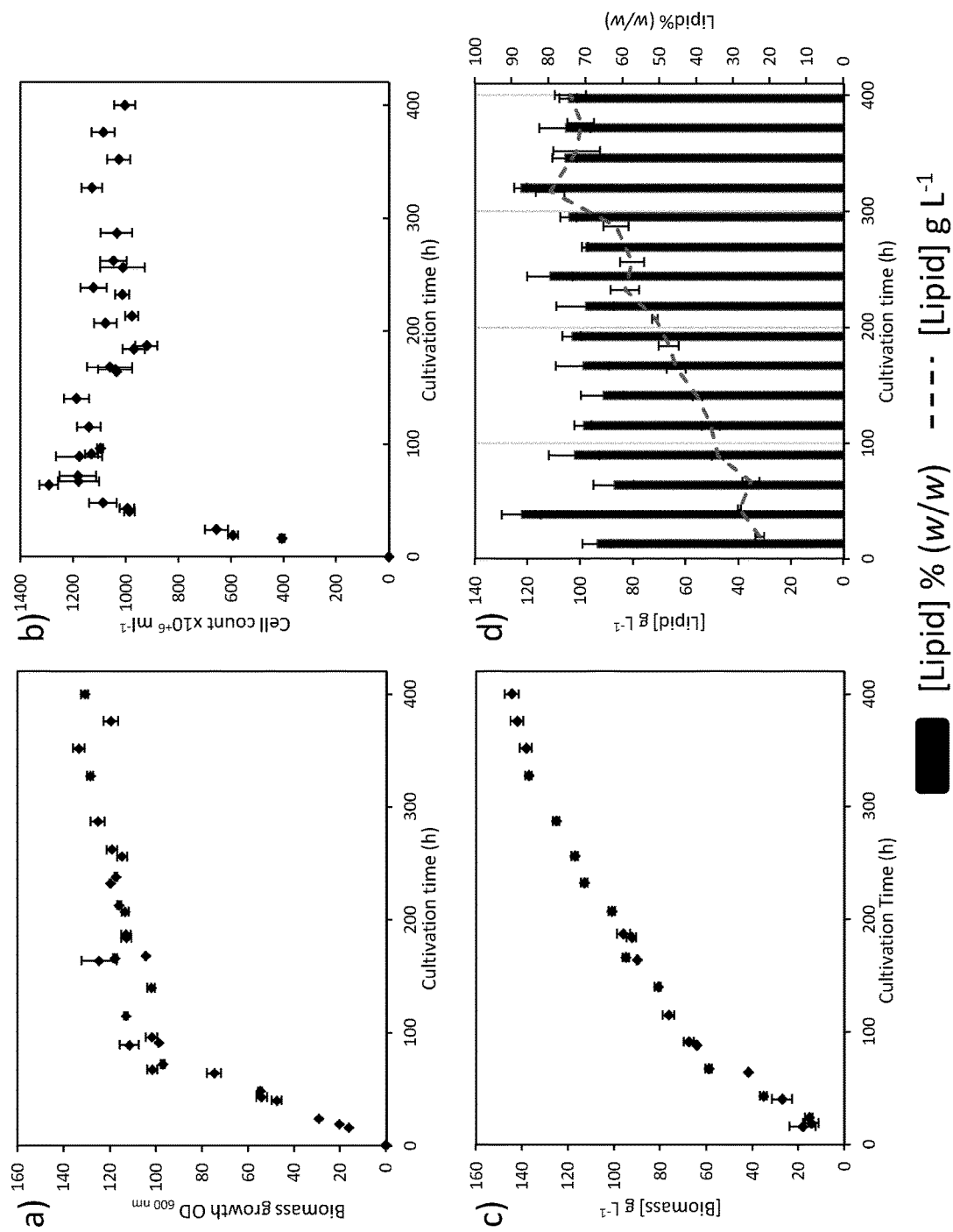
FIG. 5 shows biomass growth and lipid accumulation versus fermentation time using acetic acid and glucose co-fermentation in nitrogen rich medium using a continuous fermentation mode; (a) biomass growth measured by OD600 nm versus fermentation time; (b) biomass growth measured by cell count, versus fermentation time; (c) biomass growth measured by a gravimetric method versus fermentation time; and (d) lipid accumulation and productivity measured by gravimetric method, versus fermentation time.
Figure 12:
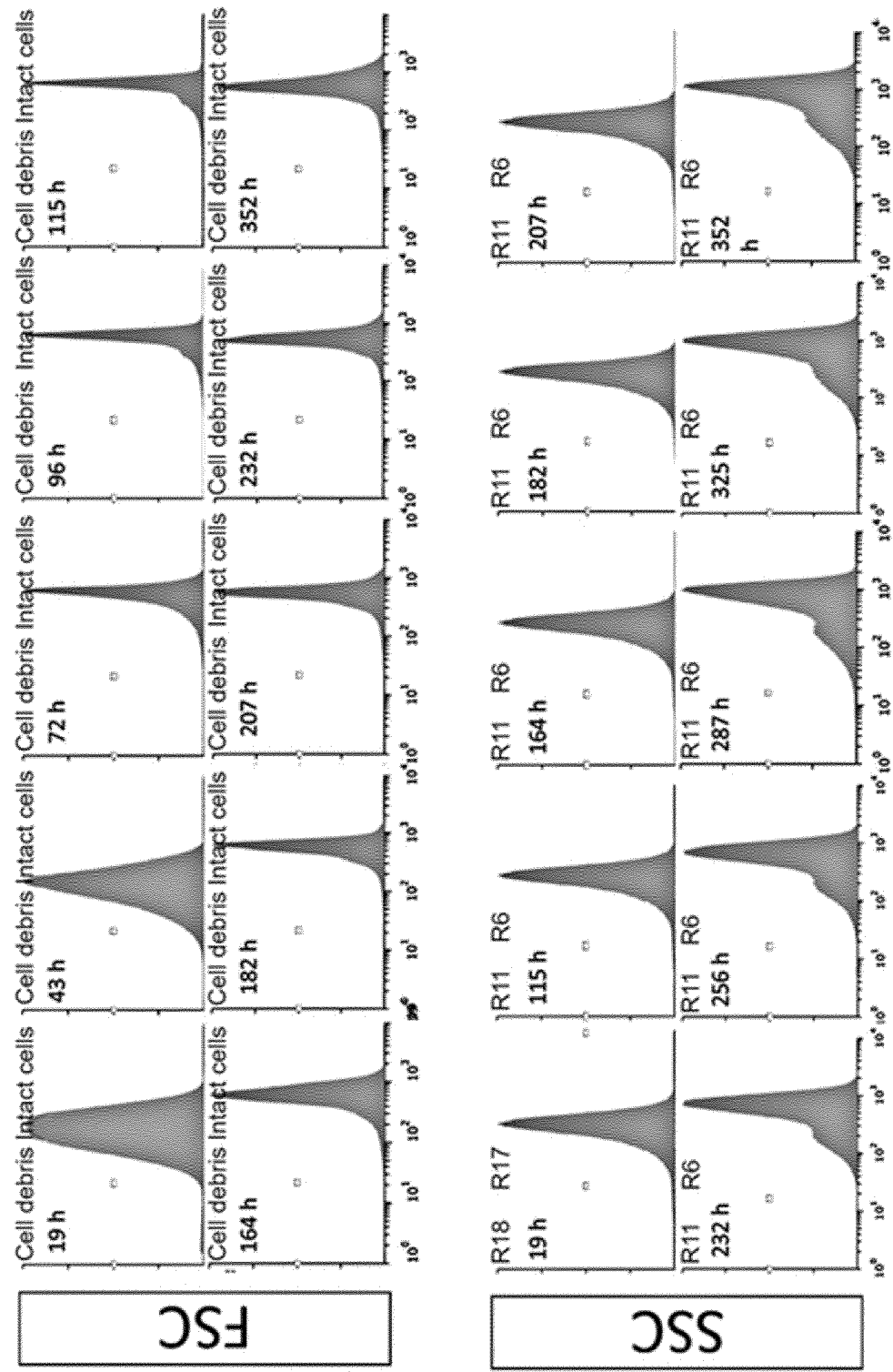
FIG. 12 shows the increase in intensity of the forward scatter [FSC] (on x axis) and side scatter [SSC] (on y axis) of an acetic acid and glucose co-fermentation versus fermentation time in nitrogen rich medium. The fermentation was done in a batch of 21-liters, temp.: 28° C., pH 6.5 and $pO_2 \geq 50\%$.
Figure 13:
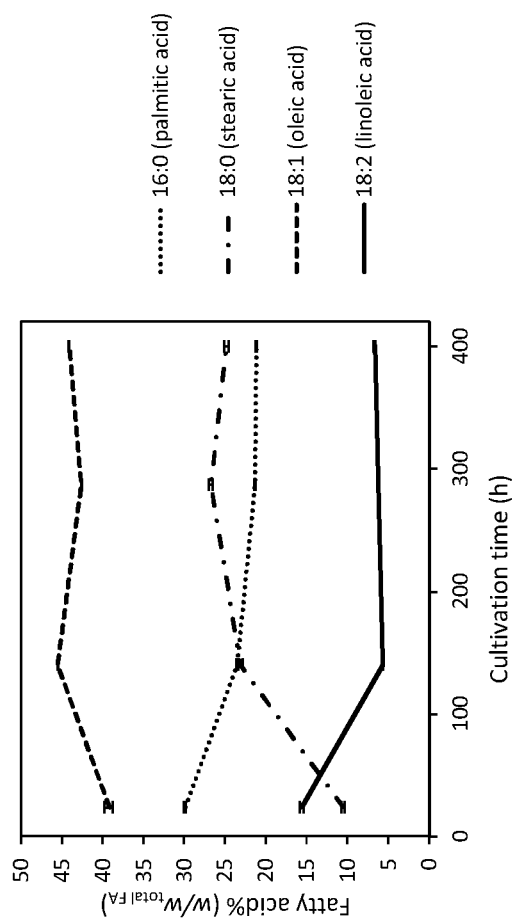
FIG. 13 shows the changes observed in the fatty acid profile (expressed as weight % per weight of total fatty acids) of an acetic acid and glucose co-fermentation versus fermentation time in nitrogen rich medium. The fermentation was done in a batch of 21-liters, temp.: 28° C., pH 6.5 and $pO_2 \geq 50\%$.

Within the first 24 h, the acetic acid feed was 2 kg per day and thereafter increased exponentially to 6 kg at 96 h. At this feeding rate, the culture volume increased by 4.5 L over 96 h [18% (v/v) volume increase], which corresponds to a dilution of 7.5 mL L$^{-1}$ h$^{-1}$. This volume increase was compensated by a daily harvest of an equivalent culture volume (4.5 L day$^{-1}$). After 96 h, a constant OD and cell count (by flow cytometry) could be detected, which was attributed to a balance between the growth rate and the applied dilution factor of the reaction (FIGS. 5a & 5b). However, while the cell count was constant, a continuous increase in biomass formation was measured, which can be attributed to a constant rise in intracellular lipids (FIGS. 5c & 5d). Therefore, the increase in biomass is only due to the expansion of cell volume, which is correlated with a volumetric expansion of intracellular lipid vesicles as detected by flow cytometry (FIG. 12). FIG. 13 shows the changes in the fatty acid profile over the fermentation time.

Based on the current data at 25 L scale, feeding with 50% ($w_{lipid}/{}^dw_{biomass}$) acetic acid allows for 20% (v/v) harvest of the fermentation volume on a daily basis or continuously without any impact on the culture density. However, scaling up this process to 10,000-L fermenter, the daily harvested volume will be 1800 liter containing 108 kg of oil. This amount can be continuously transferred to the downstream process.

With embodiments of the new process according to the present invention, the present inventors have superseded the best lipid productivities reported for various oleaginous yeasts and cultivation conditions: In that regard the lipid productivity of Lipomyces starkey in a co-fermentation of 90 g L$^{-1}$ cellobiose and xylose was 0.12 g L$^{-1}$ h$^{-1}$ [Biomass 31.5 g L$^{-1}$, lipid 55% ($w_{lipid}/^d w_{biomass}$)] (Z. Gong, Q. Wang, H. Shen, C. Hu, G. Jin and Z. K. Zhao, *Bioresource Technol.*, 2012, 117, 20-24). In the case of complex medium, usage of corn stover hydrolysate, for example, leads to a lipid productivity of 0.23 g L$^{-1}$ h$^{-1}$ [Biomass 48 g L$^{-1}$, lipid 34% ($w_{lipid}/^d w_{biomass}$)] with *Rhodotorula graminis*(S. Galafassi, D. Cucchetti, F. Pizza, G. Franzosi, D. Bianchi and C. Compagno, *Bioresource Technol.*, 2012, 111, 398-403). Similarly, *Rhodosporidium toruloides* Y4 cultivated in a 15-L stirred-tank fermenter on glucose afforded a lipid productivity of 0.54 g L$^{-1}$ h$^{-1}$, [Biomass 106.5 g L$^{-1}$, lipid 67.5% ($w_{lipid}/^d w_{biomass}$)] (Y. Li, Z. K. Zhao and F. Bai, Enzyme Microbial Technol., 2007, 41, 312-317).

With respect to the reported *C. oleaginosus* performance, a pH-stat fermentation based on acetic acid attained a productivity of 0.66 g L$^{-1}$ h$^{-1}$ [Biomass 168 g L$^{-1}$, lipid 75% ($w_{lipid}/^d w_{biomass}$)] (Z. Chi, Y. Zheng, J. Ma and S. Chen, *Int. J. Hydrogen Energ.*, 2011, 36, 9542-9550). Moreover, a genetically optimized strain of *Yarrowia lipolytica* NS432 accomplished a productivity of 0.73 g L$^{-1}$ h$^{-1}$ [Biomass 110 g L$^{-1}$, lipid 77% ($w_{lipid}/^d w_{biomass}$)] in a fed-batch glucose fermentation (J. Friedlander, V. Tsakraklides, A. Kamineni, E. H. Greenhagen, A. L. Consiglio, K. MacEwen, D. V. Crabtree, J. Afshar, R. L. Nugent and M. A. Hamilton, *Biotechnol. Biofuels*, 2016, 9, 77). However, the best literature data were achieved in an oxygen-rich batch culture of *Rhodotorula glutinis* with a productivity of 0.87 g L$^{-1}$ h$^{-1}$ [Biomass 185 g L$^{-1}$, lipid 40% ($w_{lipid}/^d w_{biomass}$)](J. G. Pan, M. Y. Kwak and J. S. Rhee, *Biotechnol. Lett.*, 1986, 8, 715-718). With regard to *Rhodotorula glutinis*, it has to be noted that this oleaginous yeast in addition to triglycerides generates significant amounts of β-carotene (terpene based lipids), which may construe the overall lipid yield in this report. Based on the present inventors' current data and cumulative literature reports, it appears that various parameters such as, acetic acid concentration, general media composition, pH, fermentation time, aeration and fermentation system itself can modulate lipid productivity.

At this point of the optimization procedure the present inventors have successfully applied a defined sugar based medium and organic acid, e.g. acetic acid, co-fermentation with *C. oleaginous* in fed-batch, semi-continuous or continuous process mode, up to a 25 L scale. At that scale, the best lipid productivity of 1.2 g L$^{-1}$ h$^{-1}$ was achieved with a semi-continuous fermentation mode utilizing synthetic N-rich (medium D) and acetic acid. This figure is a 138% improvement in lipid formation with regard to the best lipid productivity reported for *Rhodotorula glutinis*. Nonetheless, further increase in lipid yield and productivity was achieved in this study, when the yeast cell hydrolysate was used as a carbon source.

Strain: *Cutaneotrichosporon oleaginosus* (ATCC 20509) was cultivated in Erlenmeyer flasks containing YPD media broth (10 g·L$^{-1}$ yeast extract, 20 g·L$^{-1}$ peptone and 20 g·L$^{-1}$ glucose) containing antibiotics (10 mg L$^{-1}$ ampicillin, 10 mg L$^{-1}$ kanamycin and 12 mg L$^{-1}$ tetracycline). The flasks were incubated in a rotary shaker at 100 rpm and a temperature of 28° C. for 2 days, then it was used as inoculum.

Media D: glucose 30 g L$^{-1}$, yeast extract 0.5 g L$^{-1}$, peptone 5 g·L$^{-1}$, sodium acetate 4.1 g L$^{-1}$, NH$_4$Cl 0.5 g L$^{-1}$, KH$_2$PO$_4$ 2.4 g L$^{-1}$, Na$_2$HPO$_4$·12H$_2$O 0.9 g L$^{-1}$, MgSO$_4$·7H$_2$O 1.5 g L$^{-1}$, FeCl$_3$·6H$_2$O 0.08 g L$^{-1}$, ZnSO$_4$·7H$_2$O 0.01 g L$^{-1}$, CaCl$_2$·2H$_2$O 0.1 g L$^{-1}$, MnSO$_4$·5H$_2$O 0.1 mg L$^{-1}$, CuSO$_4$·5H$_2$O 0.1 mg L$^{-1}$, Co(NO$_3$)$_2$·6H$_2$O 0.1 mg L$^{-1}$.

Media E: yeast extract, 1.0 g·L$^{-1}$, peptone 1.0 g·L$^{-1}$, NH$_4$Cl 0.5 g·L$^{-1}$, KH$_2$PO$_4$ 2.4 g·L$^{-1}$, Na$_2$HPO$_4$·12H$_2$O 0.9 g·L$^{-1}$ MgSO$_4$·7H$_2$O 1.5 g·L$^{-1}$, FeCl$_3$·6H$_2$O 0.08 g·L$^{-1}$, ZnSO$_4$·7H$_2$O 0.01 g·L$^{-1}$, CaCl$_2$·2H$_2$O 0.1 g·L$^{-1}$, MnSO$_4$·5H$_2$O 0.1 mg·L$^{-1}$, CuSO$_4$·5H$_2$O 0.1 mg·L$^{-1}$, Co(NO$_3$)$_2$·6H$_2$O 0.1 mg·L$^{-1}$.

50-L Bioreactor: Fe Fed-Batch cultivation of *T. oleaginosus* was performed in a 50-L bioreactor (Bio-Engineer, USA) with a working volume of 50 L of corresponding media. The temperature was kept constant at 28° C., and the pH of the bioreactor was adjusted to pH 6.5±0.2 with 1 M NaOH or 1M HCl (incase fungi fermentation) and 50% acetic acid (in the case of AA fermentation). Stirring (350-800 rpm), aeration (1.0-2.0 NL/V of air) and pressure (0.2-1 bar) were regulated automatically to maintain dissolved oxygen at above 60%. Foam was prevented by the addition of 0.01% (V/V) of an antifoam agent (Antifoam 204, Sigma Aldrich).

1.2. Downstream Processing and Lipid Recovery

Example 7 (Production of the Hydrolysis Enzymes)

Two mutants of *T. reesei*, RUT C-30 (ATCC 56765) and (ATCC 13631), were individually cultivated in a 50-liter scale fermenter using glucose as starting carbon source. By the second fermentation day, glucose content in the medium was nearly depleted. Thereafter, the partially purified *C. oleaginosus* biomass was added to the fermentation medium at concentration of 10 g L$^{-1}$ (Medium F). Visual observation and subsequent sugar analysis was used to follow the fading of *C. oleaginosus* cells over time [Data not shown]. This indicates that *T. reesei* was able to hydrolyze the *C. oleaginosus* cells and utilize it as a carbon source. By the third day of cultivation the *C. oleaginosus* cell-debris was completely decomposed. The fermentation continued for another day to stress the fungi and induce maximal hydrolase enzyme secretion. Centrifugation, media filtration with 10-kDa cross-flow filtration and buffer ex-changing was subsequently applied to concentrate, enrich, and purify the hydrolase enzyme. The final enzyme solution was about 1 L with a protein concentration of 3.2-3.5% ($w_{protein}/v_{solation}$) of the enzymes solution from RUT C-30 (ATCC 56765) and (ATCC 13631) respectively.

Four steps were followed to evaluate the enzyme activities: 1—incubation with pure polysaccharides, 2—incubation with the purified yeast biomass, 3—incubation with real culture. Subsequently, and 4—scaling to 25-liters to verify the enzyme activities.

Fungi: *Trichoderma reesei* RUT C-30 (ATCC 56765) and (ATCC 13631) was activated in LB media (5 g L$^{-1}$ yeast extract, 10 g L$^{-1}$ Tryptone). Then it was used as inoculum for the fermentation Media F: TO cell-wall 10 g·L$^{-1}$, yeast extract 10 g·L$^{-1}$, glucose 10 g·L$^{-1}$, (NH$_4$)$_2$SO$_4$ 1.4 g·L$^{-1}$, KH$_2$PO$_4$ 2 g·L$^{-1}$, CaCl$_2$·2H$_2$O 0.4 g·L$^{-1}$, MgSO$_4$·7H$_2$O 0.3 g·L$^{-1}$, FeSO$_4$·7H$_2$O 0.005 g·L$^{-1}$, CoCl$_2$·6H$_2$O 0.0037 g·L$^{-1}$, $MnSO_4·H_2O$ 0.0016 g·L$^{-1}$, $ZnSO_4·7H_2O$ 0.0014 g·L$^{-1}$. The partially purified Cell-wall was prepared as following: After lipid extraction, residual *C. oleaginosus* biomass was washed with dd. water three times, dried by lyophilization for 2 days and grinded then it used as feedstock for *T. reesei*.

50-L Bioreactor: Fe Fed-Batch cultivation of *T. oleaginosus* was performed in a 50-L bioreactor (Bio-Engineer, USA) with a working volume of 50 L of corresponding media. The temperature was kept constant at 28° C., and the pH of the bioreactor was adjusted to pH 6.5±0.2 with 1 M NaOH or 1M HCl (incase fungi fermentation) and 50% acetic acid (in the case of AA fermentation). Stirring (350-800 rpm), aeration (1.0-2.0 NL/V of air) and pressure (0.2-1 bar) were regulated automatically to maintain dissolved oxygen at above 60%. Foam was prevented by the addition of 0.01% (V/V) of an antifoam agent (Antifoam 204, Sigma Aldrich).

Example 8 (Evaluation of Produced Enzymes on Pure Polysaccharides-Activity Assay Step 1 and Pure Yeast Biomass-Activity Assay Step 2)

Figure 6:
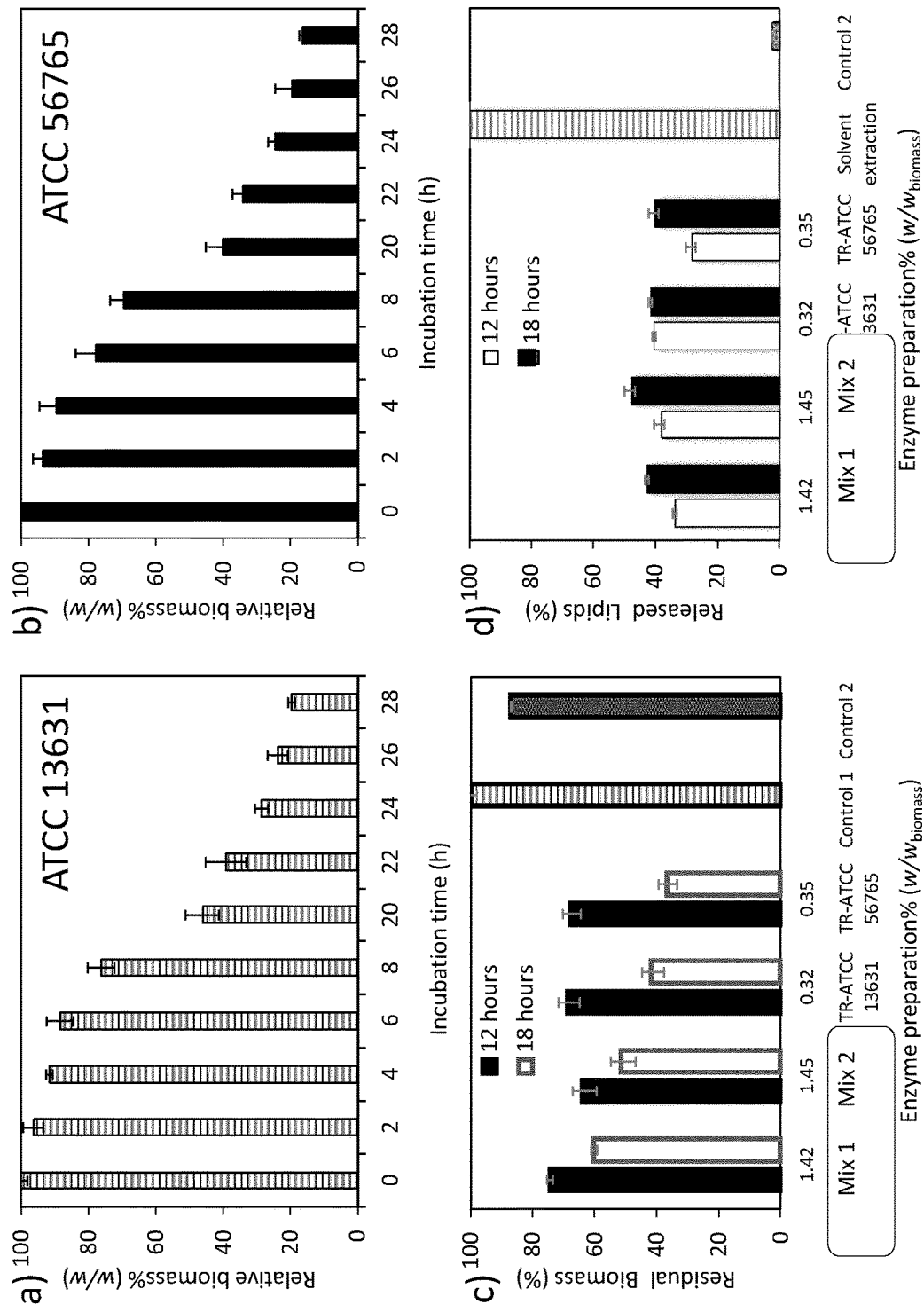
FIG. 6 shows (a) the relative decrease in biomass weight versus enzymatic hydrolysis time using *T. reesei* (ATCC 13631); (b) the relative decrease in biomass weight versus the enzymatic hydrolysis time using *T. reesei* RUT C-30 (ATCC 56765); (c) relative residual biomass weight after 12 and 18 hours incubation with the enzyme systems: Mix 1 (commercial mixture), Mix 2 (commercial mixture), the *T. reesei* ATCC 13631 and *T. reesei* RUT C-30 (ATCC 56765) and two controls: control 1=untreated biomass; control 2=biomass incubated under the same conditions, but without hydrolase treatment; (d) the relative released lipid weight after 12 and 18 hours incubation with the enzyme systems: Mix 1 (commercial mixture), Mix 2 (commercial mixture), *T. reesei* ATCC 13631 and *T. reesei* RUT C-30 (ATCC 56765), in comparison with released lipids using conventional solvent-extraction (using chloroform: MeOH as a solvent (2:1 (v/v)), and a control in which a biomass was incubated under the same conditions, but without hydrolase treatment. Mix 1: A mixture of Mannanase (Clariant-Switzerland), Cellic Ctec2 (Novozymes-Denmark), Cellic Htec (Novozymes-Denmark) and β-glucosidase (Novozymes-Denmark). Mix 2: A mixture of Liquebeet (Clariant-Switzerland), CLA (Clariant-Switzerland), Mannanase (Clariant-Switzerland), 1.3-β-glucanase (Megazyme-France) and β-glucosidase (Novozymes-Denmark).

During the incubation of the enzyme solution (at 0.35% ($w_{enzyme}/^d w_{substrate}$)) with pure polymeric sugar substrates, the present inventors could detect cellulase, xyloglucanase, β-glucosidase, mannanase, xylanase and laminarinase enzyme activities in both preparations [Data is not shown]. Subsequently, the resulting enzyme systems were tested on purified cell wall preparations of *C. oleaginosus*. FIGS. 6a & 6b show the decrease of residual biomass weight over the incubation time where just less than 16 and 20% (w/w) biomass remained after 28 hours of incubation with enzyme solution from ATCC13631 and ATCC56765 respectively.

Enzyme activity assay: To test the cellulase, xyloglucanase, β-glucosidase, mannanase, xylanase and laminarinase enzymatic activities, 50.0 mg of Cellulose, xyloglucan, cellobiose, mannan, xylan and laminarin was incubated with 1 ml of buffer (Na Acetate, 50 mM, pH5.0) and 0.35% ($w/w_{biomass}$) of enzyme solution. To test the activity of the enzyme of the *C. oleaginosus* biomass, 50.0 mg of partially purified Cell-wall was incubated with 1 ml of buffer (Na Acetate, 50 mM, pH 5.0) and 0.35% ($w/w_{biomass}$) of enzyme solution. All tests were incubated for 28 hours at 50° C. Gravimetric/sugar analysis (HPLC) were used to follow the hydrolysis.

Example 9 (Evaluation of Produced Enzymes on Fresh Culture-Activity Assay Step 3)

Later, enzyme solutions were tested over a fresh *C. oleaginosus* culture. For comparison, two mixtures of commercial enzyme systems were prepared. These two mixtures, termed Mix 1 and 2, contained the same enzyme activities as the *T. reesei* derived enzyme system. The final protein concentration in both mixtures was 14.2-14.5% ($w_{protein}/v_{solution}$) respectively. Individually, 100 µl of each of the four enzyme systems was incubated with 1.0 g biomass in 5.0 ml of acetate buffer (50 mM, pH5.0) for 18 hours. Using the same volume of the enzyme preparation leads to a different enzyme/biomass ratio (w/w). In that regard the enzyme: biomass ratio was about 1.4% ($w_{enzyme}/^d w_{biomass}$) in the commercial mixtures and around 0.35% ($w_{enzyme}/^d w_{biomass}$) for the *T. reesei* generated enzyme system respectively. In the case of the commercial mixtures, 40-48% (w/w) biomass was solubilized compared to 57-63% (w/w) with the *T. reesei* derived enzyme preparation (FIG. 6c). However, about 40% (w/w) of lipid was released in all preparations (FIG. 6d).

Enzyme activity assay-2: The partially purified Cell-wall was prepared as follows: After lipid extraction, residual *C. oleaginosus* biomass was washed with dd. water three times, dried by lyophilization for 2 days and grinded then it used as feedstock for *T. reesei*. The commercial Enzyme mixtures are: Mix 1: Mannanase (Clariant-Switzerland), Cellic Ctec2 (Novozymes-Denmark), Cellic Htec (Novozymes-Denmark) and β-glucosidase (Novozymes-Denmark). Mix 2: Liquebeet (Clariant-Switzerland), CLA (Clariant-Switzerland), Mannanase (Clariant-Switzerland), 1.3-β-glucanase (Megazyme-France) and β-glucosidase (Novozymes-Denmark).

Example 10 (Evaluation of Produced Enzymes on 25-L Scale—Activity Assay Step 4)

Subsequent to lab-based experiments, the present inventors validated the enzyme-based *C. oleaginosus* lysis procedure with a 25 L scale fermentation. The initial *C. oleaginosus* fermentation was carried out as described above, where *C. oleaginosus* growth was terminated by stopping aeration. At this point no biomass harvest was carried out. Instead, the temperature of the fermenter was increased to 45° C., the pH was adjusted to 4.5 and stirrer speed was increased to 800 rpm to enable subsequent *T. reesei* hydrolase based lysis of high lipid containing *C. oleaginosus* cells. Cell lysis was initiated by adding 0.4% ($w_{enzyme}/^d w_{biomass}$) of each *T. reesei* enzyme preparations [total concentration was of 0.8% ($w_{enzyme}/^d w_{biomass}$)]. After 20 hours of treatment the reaction conditions were modified; pH to 7.0, temperature to 37° C. Later, 0.5% ($w_{enzyme}/^d w_{biomass}$) of the commercial protease preparation (Lavergy™, BASF) was added to break down cellular proteins and induce demulsification of reaction, which assists in lipid release.

Figure 7:
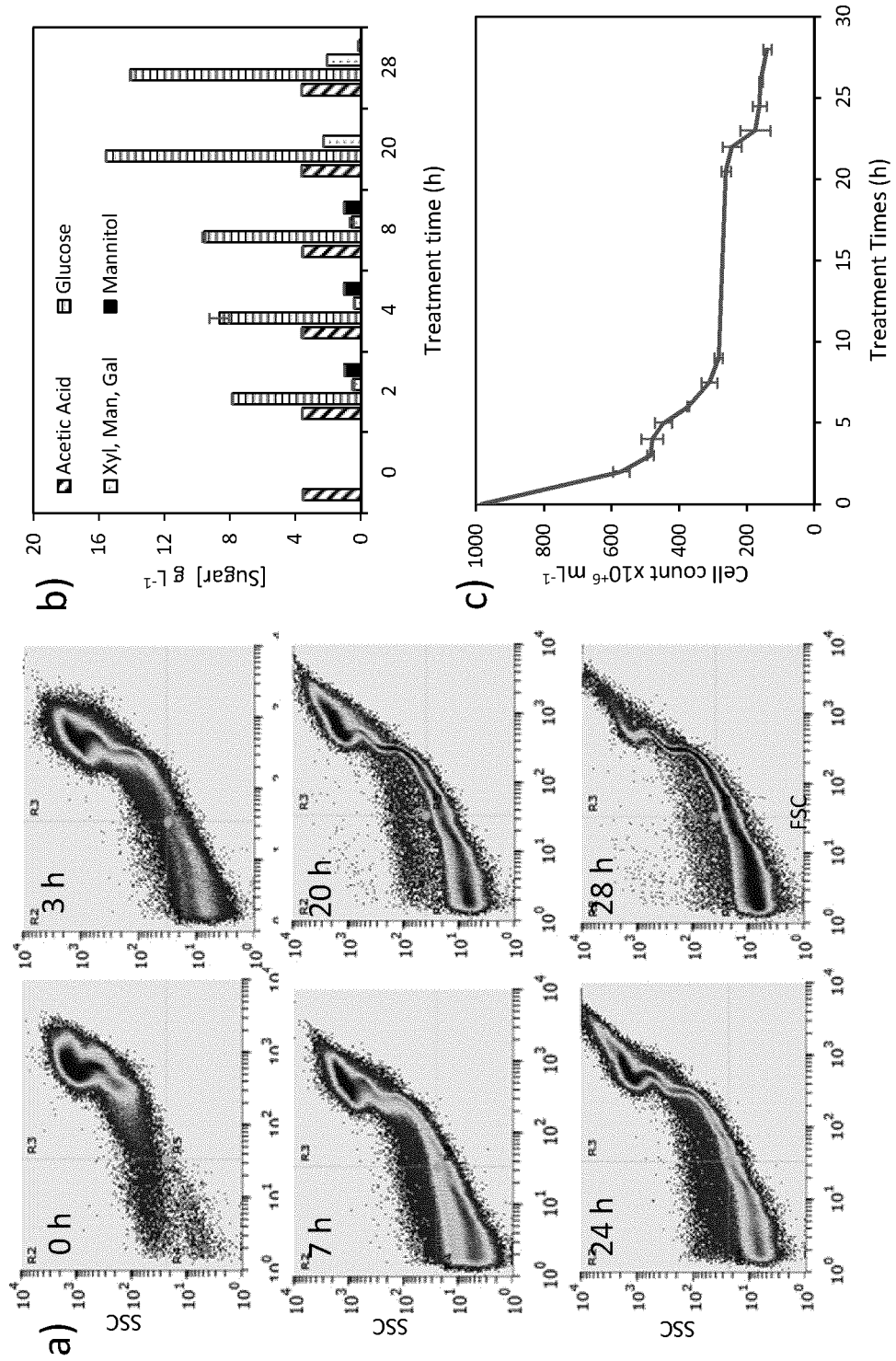
FIG. 7 shows (a) cell density plot diagrams of *C. oleaginosus* dell density versus enzymatic hydrolysis time. The cell density plot shows intensity of the forward scatter (FSC) (on the x-axis) and side scatter (SSC) (on the y-axis); (b) the increase in sugar concentration versus enzymatic hydrolysis time; (c) the decrease in cell count of *C. oleaginosus* versus enzymatic hydrolysis time.

The time resolved cell lysis and lipid release procedures, were analyzed via flow cytometry based cell counts and HPLC based sugar release. FIG. 7a shows the cell density plot as one population located in the intact cell area (R3). Over the hydrolysis time cell density in area R3 is decreased however, a new population in the smaller area (R4) are generated. This new population represent the cell debris. Cell counts (FIG. 7c) confirm the changes in the density plot by the dropping in the cell count form 983×10$^6$ cell ml$^{-1}$ before the enzymatic hydrolysis to 139×10$^6$ cell ml$^{-1}$. Sugar analysis (FIG. 7b) shows the increase in sugar content over the hydrolysis time.

Figure 8:
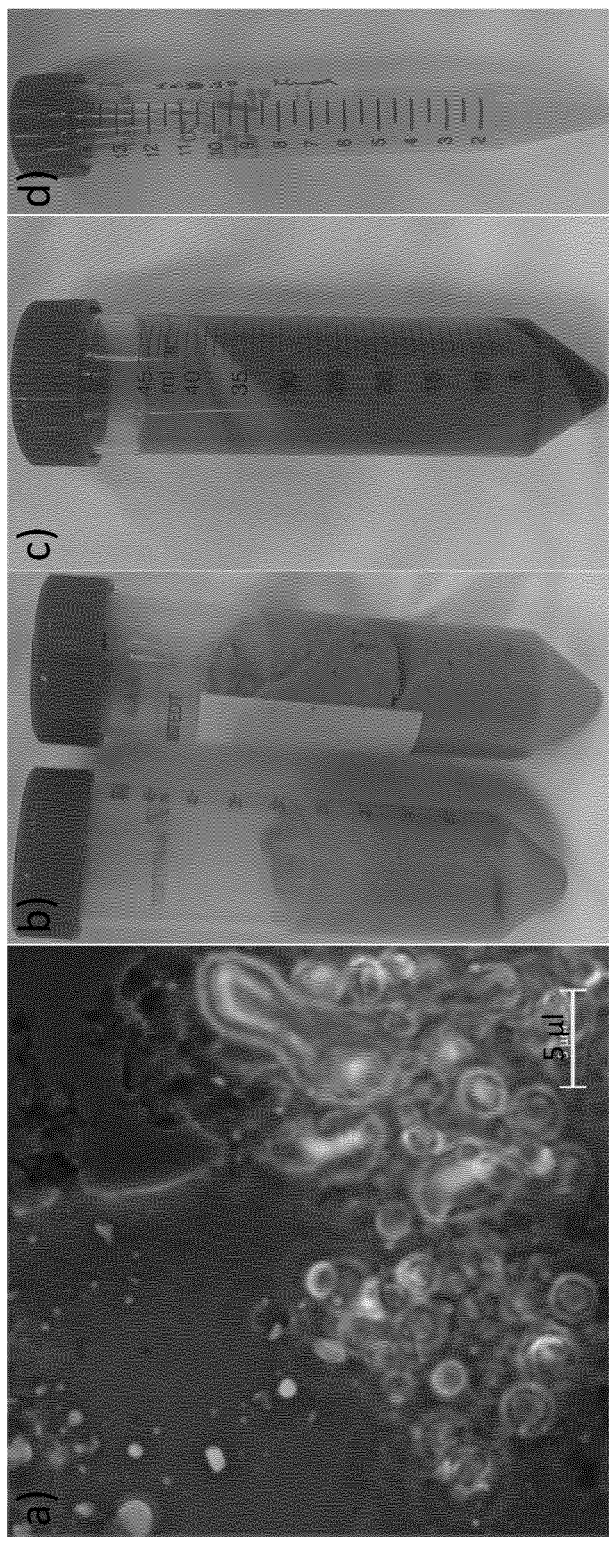
FIG. 8 shows (a) a fluorescence microscope image for yeast cells after 10 hours of enzymatic hydrolysis. The lipid was stained with Nile Red; (b) the culture after enzymatic hydrolysis, wherein the culture had been left overnight on the work bench; (c) the culture after centrifugation (at 9000 g for 20 min); (d) the floated lipid after its decantation without any further purification.

These data were additionally supplemented with fluorescence microscope, which allowed a visual in-sight of the lysis process (FIG. 8a). Thereafter, biomass was subjected to centrifugation where the upper layer fraction contained the released lipid in a surprisingly pure form. In that respect, FIGS. 8b, 8c & 8d show the released lipid after the enzymatic treatment before and after centrifugation. Cumulative data demonstrate that 85% (w/w) of the *C. oleaginosus* yeast cells were hydrolyzed and about 90% (w/w) of total intracellular lipid was successfully released. 50-L Bioreactor: Fe Fed-Batch cultivation of *T. oleaginosus* was performed in a 50-L bioreactor (Bio-Engineer, USA) with a working volume of 50 L of corresponding media. The temperature was kept constant at 28° C., and the pH of the bioreactor was adjusted to pH 6.5±0.2 with 1 M NaOH or 1M HCl (incase fungi fermentation) and 50% acetic acid (in the case of AA fermentation). Stirring (350-800 rpm), aeration (1.0-2.0 NL/V of air) and pressure (0.2-1 bar) were regulated automatically to maintain dissolved oxygen at above 60%. Foam was prevented by the addition of 0.01% (V/V) of an antifoam agent (Antifoam 204, Sigma Aldrich).

Figure 14:
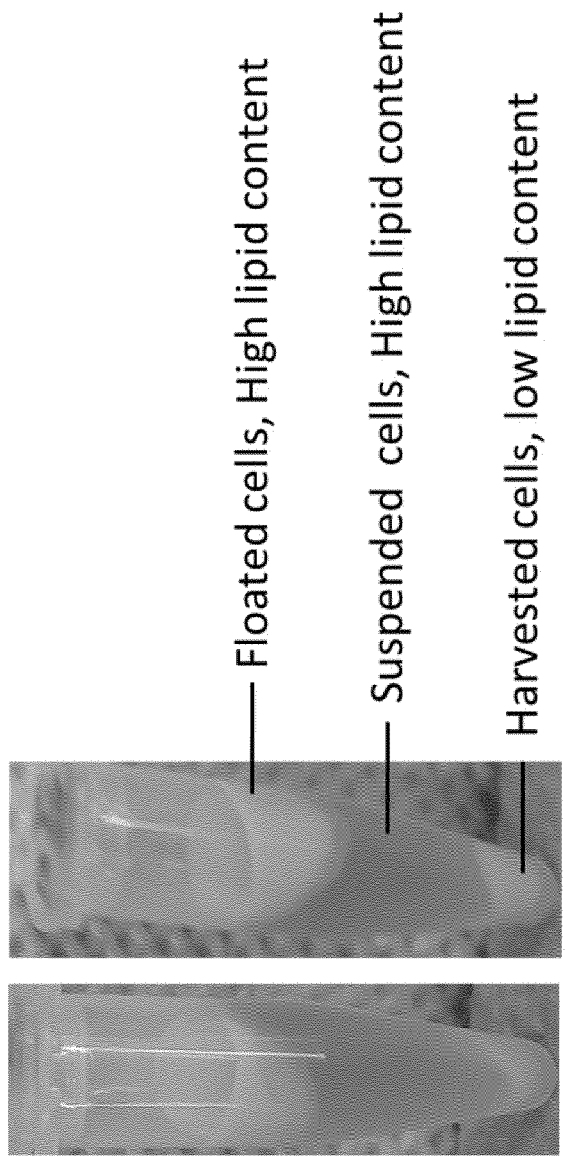
FIG. 14 shows the oily yeast culture after a fermentation using both Glucose and acetic acid in co-fermentation and after centrifugation at 15,000 g for 30 min.
Figure 15:
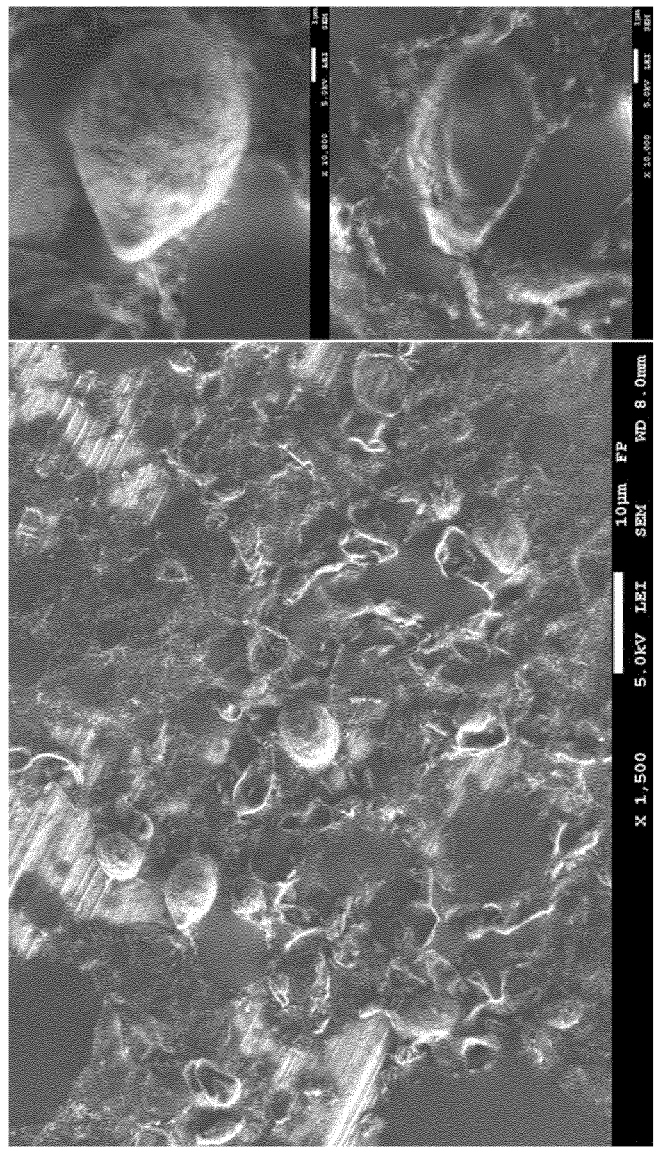
FIG. 15 shows electron microscope images for *C. oleaginous* cells after treatment with a high-pressure homogenizer applying 2400 bar three times.

The downstream process, in particular lipid extraction, has a significant impact on both economic and ecological process efficiency as well as product quality with regard to certifiable market sectors, such as the food industry. Lipid production downstream process conventionally processed over five steps; density-based biomass concentrating (such as disk-separator), cell destruction (like high a pressure homogenizer), solvent extraction (such as, hexane, or chloroform) and finally solvent separation and recovery (Such as solid/liquid-type separator followed by a single-effect evaporator). In addition to the high cost, many technical obstacles will prevent the industrial application of these processes for the commercial generation of microbial oils. First, the high lipid content (more that 50% ($w_{lipid}/^d w_{biomass}$)) of cells prevents efficient separation as cells with a high-lipid content will remain suspended in the supernatant or floated as unfastened layer on the top at high g-force centrifugation (about 50,000 g) (FIG. 14) which make harvesting step inefficient. In the subsequent step, the rigid yeast cells make high pressure homogenization even at steps insufficient. FIG. 15 shows an electron scatter micrograph for yeast cells after 3 cycles of high-pressure homogenization at 2,400 bar (i.e. not treated in accordance with the present invention). Finally, homogenized cells need to be extracted via an organic solvent. To that end, lipids extracted with organic solvents are difficult to certify for high value food and feed applications. Beyond product quality, the organic solvents will accumulate in process water and also cell residue streams, which causes significant environmental issue in valorization or recycling of these process streams.

In this study, the present inventors developed a new in-situ enzymatic treatment process that allows a quantitative cell-lysis and lipid recovery/purification without the need for a pretreatment or application of an organic solvent assisted lipid recovery step. However, the carbohydrate and protein hydrolysis products (the monomeric sugars and amino acids) can potentially be reused in subsequent fermentations since they are not contaminated with any solvent traces.

1.3. Recycling Biomass and Hydrolysate Fractions

Example 11 (Test of the Yeast Hydrolysate as Fermentation Medium—Recycling Experiment)

Figure 9:
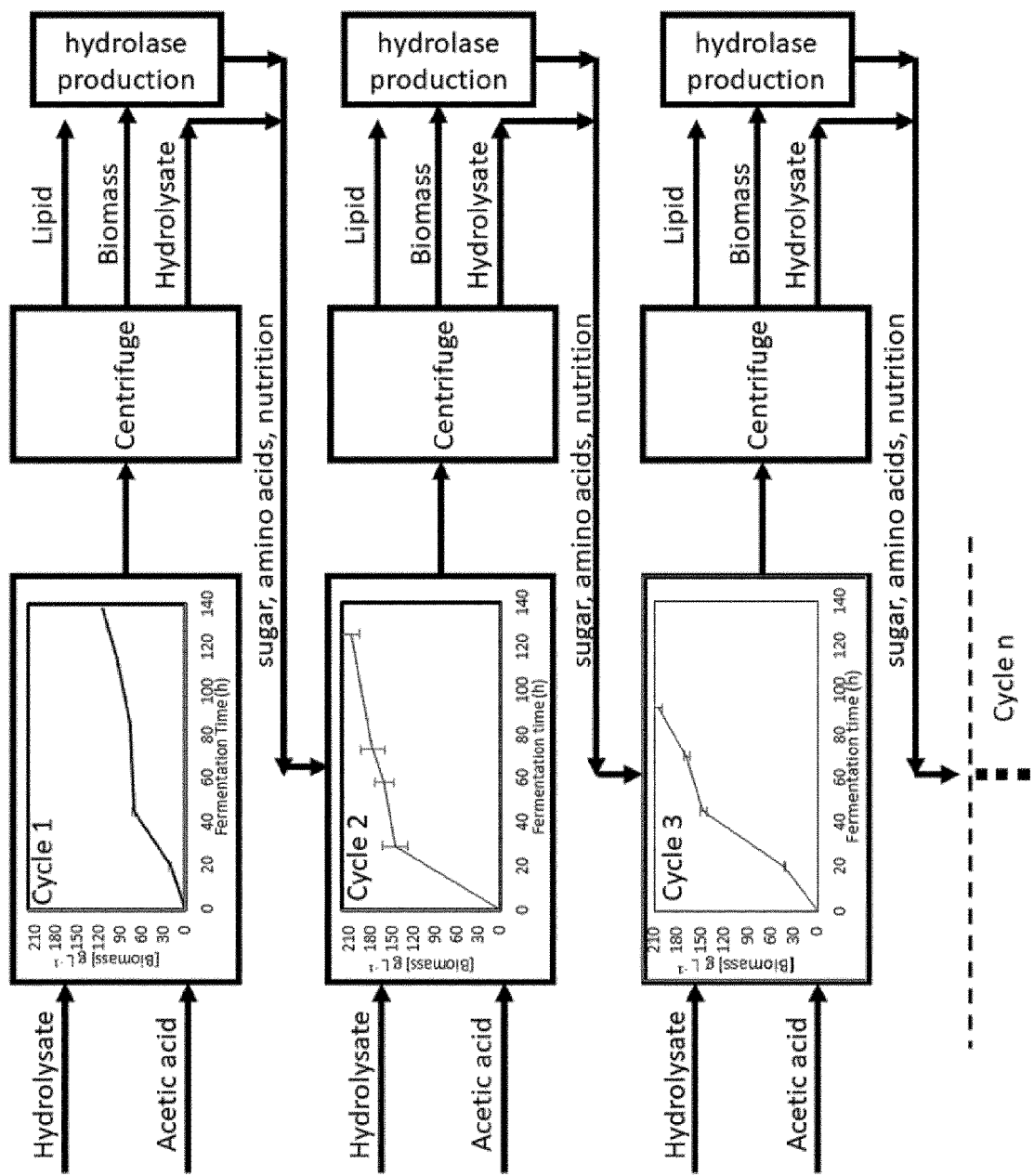
FIG. 9 shows biomass growth, measured by gravimetric method, versus fermentation time using acetic acid and glucose co-fermentation. In cycle 1, the medium used was a nitrogen-rich medium using both glucose and acetic acid, additionally including a peptide hydrolysate. In cycle 2 and 3, the used media included hydrolysate(s) generated in the previous cycle.

Initially 500 mL of medium G was used in the first *C. oleaginosus* cultivation cycle. FIG. 9 shows the initial *C. oleaginosus* growth rate over the fermentation time. With these experimental set, lipid productivity was 1.23 g L$^{-1}$ h$^{-1}$ [Biomass 72 g L$^{-1}$, Lipid 77% ($w_{lipid}/^d w_{biomass}$)] after 45 h. At the end of the fermentation (at 138 h) lipid productivity was 0.71 g L$^{-1}$ h$^{-1}$ [biomass 115.6 gL$^{-1}$, Lipid 85% ($w_{lipid}/^d w_{biomass}$)].

Subsequently, *C. oleaginosus* biomass lysis and lipid release was mediated by subsequent gluco-hydrolase and protease treatments as described above. The resulting liquid hydrolysate containing sugars, amino acids and micronutrients was filtered by 10 KDa cross-filter for sterilization and to remove remaining the enzyme residues. Thereafter, the hydrolysate was adjusted to 60 g L$^{-1}$ glucose and used as the fermentation medium in an additional cultivation cycle.

Interestingly, with this hydrolysate containing fermentation medium, the biomass productivity was considerably increased to 147 g L$^{-1}$ after 45 h. Concurrent the lipid productivity was recorded to be 2.4 L$^{-1}$ h$^{-1}$[biomass 147 g L$^{-1}$, Lipid 73% ($w_{lipid}/^d w_{biomass}$)]. These results could be exactly reproduced in the following third cultivation run (FIG. 9). The biomass and lipid productivities as well as respective total yields are superior to any of the previous results. Consequently, this data significantly exceeds the best literature values for biomass and lipid productivities by 1.5 and 2.9 fold respectively 45. Moreover, the present inventors' current data indicates that superior biomass and lipid productivities are obtained within the first 45 h of the experiment. Therefore, the present inventors suggest that for cost and mass efficient fermentation a short cultivation time of 45-72 h is sufficient to obtain maximal yields.

Media G: Glucose 50-60 g·L$^{-1}$, yeast extract 5 g·L$^{-1}$, Peptone 5 g·L$^{-1}$, (NH$_4$)$_2$SO$_4$ 1.4 g·L$^{-1}$, KH$_2$PO$_4$ 2 g·L$^{-1}$, CaCl$_2$·2H$_2$O 0.4 g·L$^{-1}$, MgSO$_4$·7H$_2$O 0.3 g·L$^{-1}$, FeSO$_4$·7H$_2$O 0.005 g·L$^{-1}$, CoCl$_2$·6H$_2$O 0.0037 g·L$^{-1}$, MnSO$_4$·H$_2$O 0.0016 g·L$^{-1}$, ZnSO$_4$·7H$_2$O 0.0014 g·L$^{-1}$.

1-L Bioreactor: DASGIP® parallel bioreactor System (Eppendorf, Germany) with a working volume of 4 times 1 L of corresponding media. The temperature was varied 28-30° C., and the pH of the bioreactor was adjusted to pH 7.0-6.5±0.2 with 1 M NaOH or 70-100% acetic acid. Stirring (350-800 rpm), Oxygen ratio (21-100%) and aeration (1.0-2.0 NL/V of air) were regulated automatically to maintain dissolved oxygen at above of pO$_2$≥50%. Foam was prevented by the addition of 0.01% (V/V) of an antifoam agent (Antifoam 204, Sigma Aldrich).

The present inventors have presented a *C. oleaginosus* co-fermentation system that enables simultaneous assimilation of both carbon source and organic acid, e.g. sugar and acetic acid leading to concurrently high biomass and lipid yields without the need of nutrient restriction. While the lipid is considered as the main revenue stream for this process, residual biomass after lipid extraction is conventionally deemed a low value side product. In standard processes that rely on solvent assisted lipid extraction/purification, this biomass side stream is contaminated with solvent residues and has to be treated as an environmentally harmful waste stream that has to be disposed under strict regulatory requirements that inherently add process costs.

In contrast to these conventional processes, the present inventors' enzymatic hydrolysis converted yeast biomass residues to fermentable sugars at a total concentration of 18 g L$^{-1}$, without any involvement of organic solvents. Additionally, the resulting yeast hydrolysate also contains valuable amino acids, soluble phospholipids, minerals and hydrophilic secondary metabolites, which can enhance growth of *C. oleaginosus*. To that end, recycling of this hydrolysate has many advantages such as saving the raw material and eliminating waste streams. In subsequent experiments the present inventors explored the recycling of *C. oleaginosus* cell lysate as a fermentation base for repeated batch cultivations and lipid production.

Example 12 (Test Different Operation Conditions)

In this experiment set, different operation conditions were applied. Table 1 shows the applied operation setting.

Figure 16:
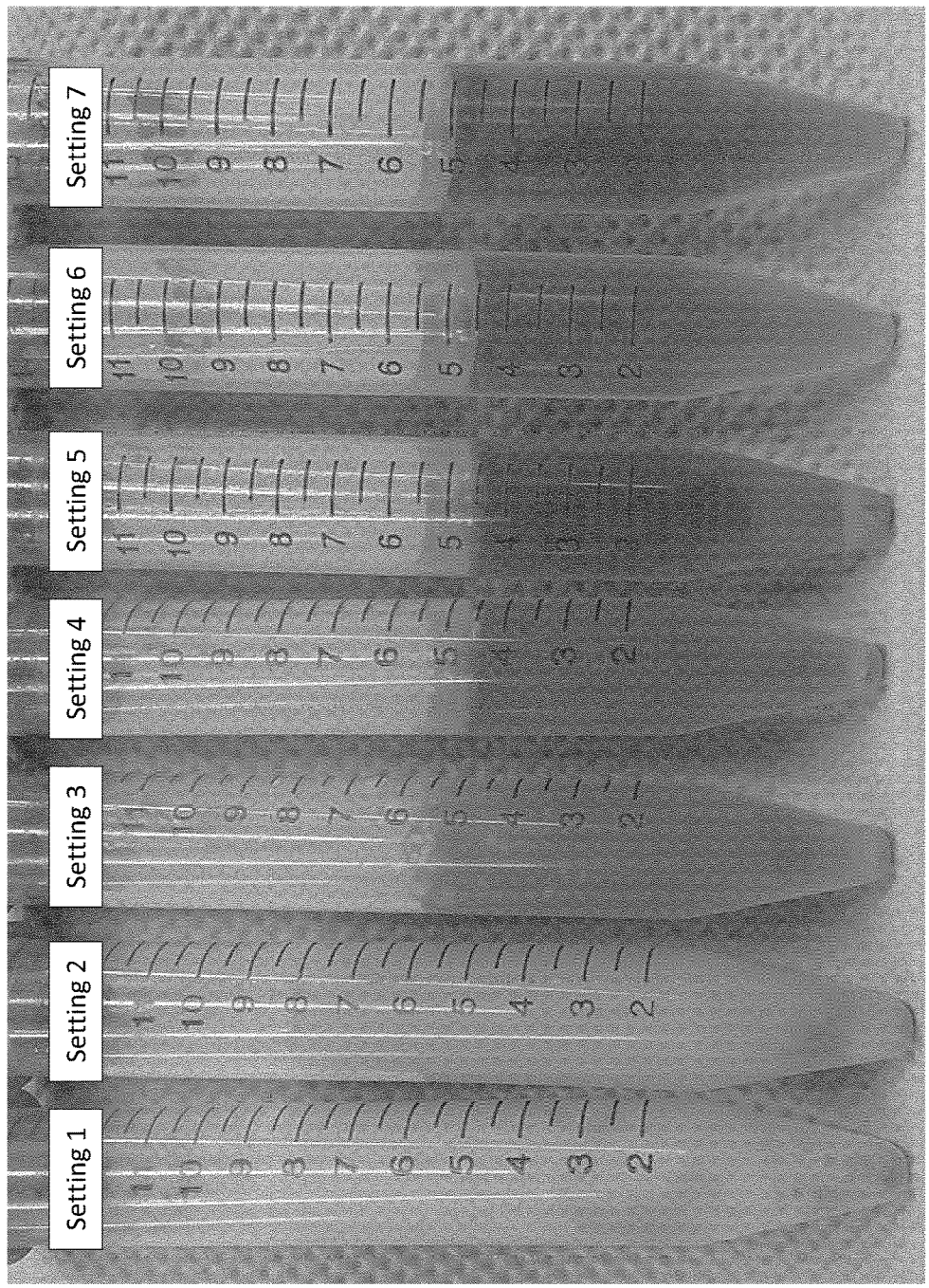
FIG. 16 shows produced lipid samples under different operation conditions.

The results shows that, the status of resulting lipid at 20° C. (Table 1, FIG. 16) is changing from hard/solid to liquid as the fermentation temperature as well as dissolved oxygen is reduced from 28 to 10 and from 70 to 30 respectively.

However, low temperature and dissolved oxygen results in dark reddish oil. Adding crotonic acid to the acetic acid in combination with low temperature and dissolved oxygen improves the color of the lipid and makes it very light yellow.

| Setting code | Growth Temperature (° C.) | Dissolved Oxygen (%) | Carbon source | Organic acid | Lipid status At (20° C.) | pour point DIN ISO 3016 (° C.) | Color code |
|---|---|---|---|---|---|---|---|
| Setting 1 | 28 | 70 | Glucose | Acetic acid | Hard | 15 | Light |
| Setting 2 | 28 | 40 | Glucose | Acetic acid | Hard/with little liquid | 14 | Light |
| Setting 3 | 16 | 50 | Glucose | Acetic acid | viscous hard/liquid | 11 | Light |
| Setting 4 | 10 | 50 | Glucose | Acetic acid | Liquid/turbid | 9 | Dark yellow/ light reddish |
| Setting 5 | 10 | 30 | Glucose | Acetic acid | Liquid clear | 8 | Dark yellow/ reddish |
| Setting 6 | 10 | 50 | Glucose | Acetic acid/ crotonic acid | Liquid clear | 5 | v. Light yellow |
| Setting 7 | 10 | 30 | Glucose | Acetic acid/ crotonic acid | Liquid highly clear | 5 | v. Light yellow |

Strain: *Cutaneotrichosporon oleaginosus* (ATCC 20509) was cultivated in Erlenmeyer flasks containing YPD media broth (10 g·L$^{-1}$ yeast extract, 20 g·L$^{-1}$ peptone and 20 g·L$^{-1}$ glucose) containing antibiotics (10 mg L$^{-1}$ ampicillin, 10 mg L$^{-1}$ kanamycin and 12 mg L$^{-1}$ tetracycline). The flasks were incubated in a rotary shaker at 100 rpm and a temperature of 28° C. for 2 days, then it was used as inoculum.

Media D: glucose 30 g L$^{-1}$, yeast extract 0.5 g L$^{-1}$, peptone 5 g·L$^{-1}$, sodium acetate 4.1 g L$^{-1}$, NH$_4$Cl 0.5 g L$^{-1}$, KH$_2$PO$_4$ 2.4 g L$^{-1}$, Na$_2$HPO$_4$·12H$_2$O 0.9 g L$^{-1}$, MgSO$_4$·7H$_2$O 1.5 g L$^{-1}$, FeCl$_3$·6H$_2$O 0.08 g L$^{-1}$, ZnSO$_4$·7H$_2$O 0.01 g L$^{-1}$, CaCl$_2$·2H$_2$O 0.1 g L$^{-1}$, MnSO$_4$·5H$_2$O 0.1 mg L$^{-1}$, CuSO$_4$·5H$_2$O 0.1 mg L$^{-1}$, Co(NO$_3$)$_2$·6H$_2$O 0.1 mg L.

1-L Bioreactor: DASGIP® parallel bioreactor System (Eppendorf, Germany) with a working volume of 4 times 1 L of corresponding media. The temperature was varied 28-30° C., and the pH of the bioreactor was adjusted to pH 7.0-6.5±0.2 with 1 M NaOH or 100% acetic acid or mixture of acetic acid with other organic acid. Stirring (350-800 rpm), Oxygen ratio (21-100%) and aeration (1.0-2.0 NL/V of air) were regulated automatically to maintain dissolved oxygen at above of pO$_2$≥50%. Foam was prevented by the addition of 0.01% (V/V) of an antifoam agent (Antifoam 204, Sigma Aldrich).

GC-FID: Fatty acid profiles were measured using gas chromatography with flame ionization detector (GC-FID) after methylation. The methylation was briefly done by incubating 1 mg of oil with 1 ml of NaOCH$_3$ (for 20 min at 80° C.). Then a 1 ml of HCl (37% in Methanol) was and the mixture was incubated again for 20 min at 80° C. Resulted fatty acid methyl esters (FAMEs) were extracted by hexane in injected GC-FID (Shimadzu, Japan). The triglycerol C19:0 was used as an internal standard.

Biomass and lipid accumulation turned out to be similar in all bioreactors. This confirms the possibility to apply iBA, iVA, and CA as feedstock. However and to some extent, GC-FID analysis for the fatty acid profiles showed a varied fatty acid distribution depending on the applied feedstock. FIGS. 17, 18, 19 and 20 show the change in peak intensity of C16:0, C18:0, C18:1, and C18:2, which can be attributed to changes in the fatty acid concentrations contingent on used acid. Moreover, new peaks that refer to a new fatty acid are detected. For instance, FIG. 17 shows the typical fatty acid profile, which is obtained by applying acetic acid as a feedstock. However, applying 10% iBA results in the formation of C17:0 and C17:1 (FIG. 18). Moreover, additional five unknown peaks were formed intensively in the case of applying 10% iVA (FIG. 19).

Strain: *Cutaneotrichosporon oleaginosus* (ATCC 20509) was cultivated in Erlenmeyer flasks containing YPD media broth (10 g·L$^{-1}$ yeast extract, 20 g·L$^{-1}$ peptone and 20 g·L$^{-1}$ glucose) containing antibiotics (10 mg L$^{-1}$ ampicillin, 10 mg L$^{-1}$ kanamycin and 12 mg L$^{-1}$ tetracycline). The flasks were incubated in a rotary shaker at 100 rpm and a temperature of 28° C. for 2 days, then it was used as inoculum.

Media D: glucose 30 g L$^{-1}$, yeast extract 0.5 g L$^{-1}$, peptone 5 g·L$^{-1}$, sodium acetate 4.1 g L$^{-1}$, NH$_4$Cl 0.5 g L$^{-1}$, KH$_2$PO$_4$ 2.4 g L$^{-1}$, Na$_2$HPO$_4$·12H$_2$O 0.9 g L$^{-1}$, MgSO$_4$·7H$_2$O 1.5 g L$^{-1}$, FeCl$_3$·6H$_2$O 0.08 g L$^{-1}$, ZnSO$_4$·7H$_2$O 0.01 g L$^{-1}$, CaCl$_2$·2H$_2$O 0.1 g L$^{-1}$, MnSO$_4$·5H$_2$O 0.1 mg L$^{-1}$, CuSO$_4$·5H$_2$O 0.1 mg L$^{-1}$, Co(NO$_3$)$_2$·6H$_2$O 0.1 mg L 1-L Bioreactor: DASGIP® parallel bioreactor System (Eppendorf, Germany) with a working volume of 4 times 1 L of corresponding media. The temperature was varied 28-30° C., and the pH of the bioreactor was adjusted to pH 7.0-6.5±0.2 with 1 M NaOH or 70-100% acetic acid. Stirring (350-800 rpm), Oxygen ratio (21-100%) and aeration (1.0-2.0 NL/V of air) were regulated automatically to maintain dissolved oxygen at above of pO$_2$≥50%. Foam was prevented by the addition of 0.01% (V/V) of an antifoam agent (Antifoam 204, Sigma Aldrich).

Example 13

In this experiment, the present inventors studied the effect of applying other organic acids as feedstock on the oily yeast growth, lipid accumulation and the fatty acid profile produced oil. Therefore, acetic acid (AA), isobutyric acid (iBA), isovaleric acid (iVA) and crotonic acid (CA) were applied as organic acid source(s) in co-fermentation with glucose. Use of acetic acid within the co-fermentation system was validated in the previous examples. Thus, acetic acid was used as a control in this example.

The four-parallel DASGIP® bioreactors system from Eppendorf was selected for this experiment. In bioreactor 1, 100% acetic acid was applied as a source of organic acid, whereas, a mixture of 90% acetic acid in combination with 10% of isobutyric acid, isovaleric acid or crotonic acid were applied as organic acid mixtures in bioreactors 2, 3 and 4 respectively.

CONCLUSION

The present inventors demonstrate an integrated operation units for bioconversion of acetic acid and sugar to sustainable lipids at maximized productivity coupled with minimized waste generation and energy consumption. To that end, the cost gap to plant-based lipid was considerably reduced.

The invention claimed is:

1. A method for producing microbial lipids, said method comprising the steps:
   a) providing an oleaginous microorganism, wherein said oleaginous microorganism is an oleaginous yeast selected from the genus *Cutaneotrichosporon, Trichosporon, Cryptococcus*, and *Apiotrichum*;
   b) growing said oleaginous microorganism in a medium comprising a carbon source and an organic acid, and thereby allowing said oleaginous microorganism to produce microbial lipids, wherein said carbon source is selected from the group consisting of carbohydrates, and amino acids; and
   wherein said organic acid is selected from the group consisting of acetic acid, malonic acid, oxalic aacid, citric acid, propionic acid, valeric acid, acrylic acid, crotonic acid, butyric acid, Isobutyric acid, isovaleric acid, 3-hydroxybutyric acid, 3-hydroxypropionic acid, 2-hydroxybutyric acid, lactic acid, and the respective salt(s) of such acids, and mixtures of any of said organic acids and/or salts;
   c) performing a purely enzymatic treatment of said grown oleaginous microorganism without any solvent-based extraction or chemicals-based demulsification, to make said produced microbial lipids amenable for subsequent harvesting, wherein said purely enzymatic treatment of said grown oleaginous microorganism is a treatment of said oleaginous microorganism with a hydrolase, alone, or in combination with/followed by a protease, wherein said hydrolase is obtained from a filamentous fungus that has been cultured in the presence of an inducing system, wherein said inducing system is a component of said oleaginous microorganism; and
   d) harvesting said produced microbial lipids by a density-based separation method.

2. The method according to claim 1, wherein said density-based separation method is selected from separation based on natural gravity, gravity-assisted phase separation, and centrifugation, wherein each of said separation based on natural gravity, gravity-assisted phase separation, and centrifugation, is performed alone or in combination with a decantation, aspiration or other mechanical harvesting method.

3. The method according to claim 1, wherein steps b) and c) are performed within the same reaction vessel.

4. The method according to claim 1, wherein step c) and/or d) results in a lipid-phase, a residual biomass of said oleaginous microorganism and a hydrolysate of said oleaginous microorganism, wherein said method involves a repeated performance of steps b)-d), and wherein said hydrolysate of said oleaginous microorganism resulting from steps c) and/or d) is reused/recycled for performing step b).

5. The method according to claim 4, wherein steps b)-d) are performed 2-n-times, wherein n is an integer, selected from 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

6. The method according to claim 1, wherein said medium used in step b) is a nitrogen-rich medium in which the weight ratio of carbon to nitrogen (C:N) is ≤80.

7. The method according to claim 1, wherein said medium used in step b) further comprises a nitrogen source in the form of a protein hydrolysate.

8. The method according to claim 1, wherein said protease, if present, is selected from proteases produced by *Aspergillus* sp., *Streptomyces* sp. or *Bacillus* sp.

9. The method according to claim 1, wherein said hydrolase obtained from said fungus is prepared separately as a liquid preparation directly obtained from culturing said fungus, or as a freeze-dried preparation that is subsequently reconstituted in solution.

10. The method according to claim 1, wherein said hydrolase contains one or several activities selected from cellulase, xyloglucanase, beta-glucosidase, mannanase, xylanase, and laminarinase enzyme activities.

11. The method according to claim 4, wherein said method is performed in fed-batch manner, semi-continuous or continuous mode-manner, wherein said method involves the repeated addition of acetic acid or acetate.

12. The method according to claim 1, wherein the carbon source is glucose and/or xylose.

13. The method according to claim 1, wherein the filamentous fungus is selected from *Trichoderma, Aspergillus, Penicillium, Aureobasillium* and *Fusarium*.

14. The method according to claim 7, wherein said protein hydrolysate is a peptone or tryptone hydrolysate that comprises animal tissue, plant tissue and/or components of said oleaginous microorganism.

\* \* \* \* \*